United States Patent
Kouda et al.

(10) Patent No.: US 8,253,296 B2
(45) Date of Patent: *Aug. 28, 2012

(54) STATOR FOR ROTARY ELECTRIC MACHINE AND ROTARY ELECTRIC MACHINE USING SAME

(75) Inventors: Shinji Kouda, Kariya (JP); Hiroaki Kajiura, Nagoya (JP); Masahiro Takada, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,156

(22) Filed: Jul. 25, 2011

(65) Prior Publication Data
US 2012/0007462 A1    Jan. 12, 2012

Related U.S. Application Data

(62) Division of application No. 12/529,651, filed as application No. PCT/JP2008/053811 on Mar. 4, 2008, now Pat. No. 8,008,830.

(30) Foreign Application Priority Data

| Mar. 5, 2007 | (JP) | 2007-054564 |
| Oct. 12, 2007 | (JP) | 2007-266849 |
| Mar. 3, 2008 | (JP) | 2008-052528 |

(51) Int. Cl.
*H02K 3/00* (2006.01)

(52) U.S. Cl. ........ 310/201; 310/207

(58) Field of Classification Search ........ 310/180, 310/184, 201, 203, 206–208
See application file for complete search history.

(56) References Cited

U.S. PATENT DOCUMENTS

| 5,965,965 | A |  | 10/1999 | Umeda et al. |
| 5,998,903 | A |  | 12/1999 | Umeda et al. |
| 6,011,332 | A | * | 1/2000 | Umeda et al. ........ 310/58 |
| 6,137,201 | A | * | 10/2000 | Umeda et al. ........ 310/179 |
| 6,373,164 | B1 | * | 4/2002 | Nishimura ........ 310/207 |

(Continued)

FOREIGN PATENT DOCUMENTS
JP    8-84448    3/1996
(Continued)

OTHER PUBLICATIONS

English translation of the International Preliminary Report on Patentability, dated Sep. 17, 2009, issued in corresponding Japanese Application No. PCT/JP2008/053811.
International Search Resort for PCT/JP2008/053811 mailed Apr. 22, 2008.

(Continued)

*Primary Examiner* — Tran Nguyen
(74) *Attorney, Agent, or Firm* — Nixon & Vanderhye PC

(57) ABSTRACT

The wire 30 forming the stator winding 20 includes the in-slot portions 40 to be disposed in the slots 14 and 15 of the stator core 12 and the turned portions 42 connecting the in-slot portions 40 disposed in the circumferentially different slots 14 and 15. The turned portions 42 formed on axial opposite end sides of the stator core 12. The crank portion 44 which does not twist is formed at substantially the center of the turned portion 42. Steps are formed at sections of the turned portion 42 which protrude outside the stator core 12 from the slots 14 and 15. Further, the turned portion 42 of the wire 30 also has two steps 48 formed between the substantially central crank portion 44 and each of the steps 46 formed at the protruding sections of the turned portion 42.

20 Claims, 25 Drawing Sheets

U.S. PATENT DOCUMENTS

| | | | |
|---|---|---|---|
| 6,501,205 B1 * | 12/2002 | Asao et al. | 310/184 |
| 6,515,393 B2 * | 2/2003 | Asao et al. | 310/184 |
| 6,930,426 B2 * | 8/2005 | Neet et al. | 310/208 |
| 6,958,561 B2 | 10/2005 | Liao | |
| 7,812,498 B2 * | 10/2010 | Kouda | 310/201 |
| 8,008,830 B2 * | 8/2011 | Kouda et al. | 310/201 |
| 2001/0019234 A1 * | 9/2001 | Murakami et al. | 310/180 |
| 2007/0022596 A1 | 2/2007 | Nishimura et al. | |
| 2010/0141078 A1 | 6/2010 | Kouda et al. | |
| 2010/0244615 A1 | 9/2010 | Kouda | |
| 2011/0210638 A1 * | 9/2011 | Ogawa et al. | 310/195 |

FOREIGN PATENT DOCUMENTS

| | | |
|---|---|---|
| JP | 11-075346 | 3/1999 |
| JP | 11-285216 | 10/1999 |
| JP | 2003-018778 | 1/2003 |
| JP | 2003-88023 | 3/2003 |
| JP | 2003-274594 | 9/2003 |
| WO | WO 02/47239 | 6/2002 |

* cited by examiner

FIRST EMBODIMENT

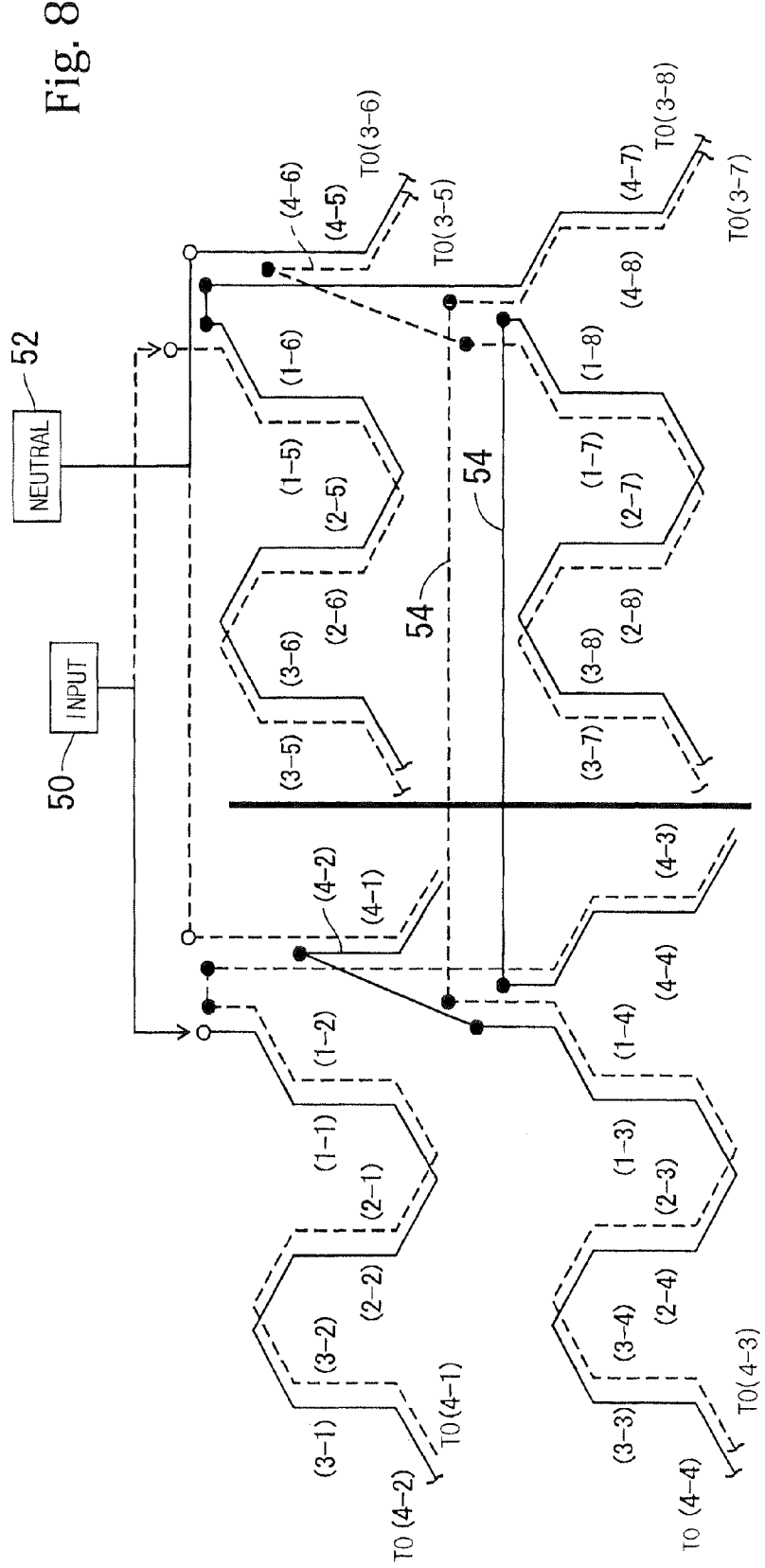

SECOND EMBODIMENT

Fig. 14
(A)
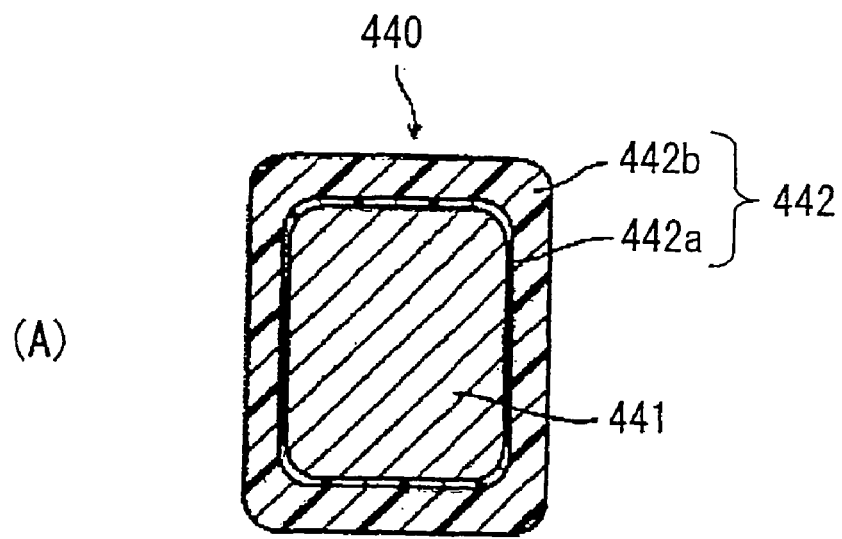
(B)
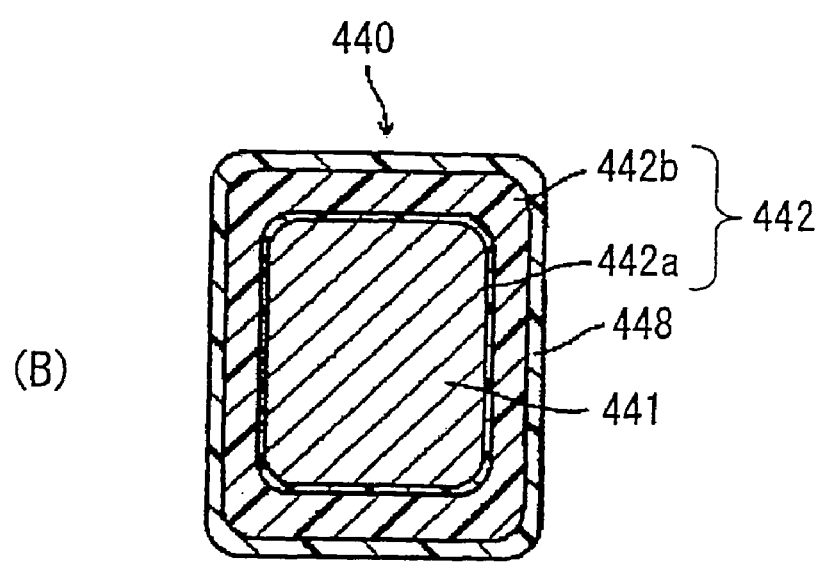

Fig. 21
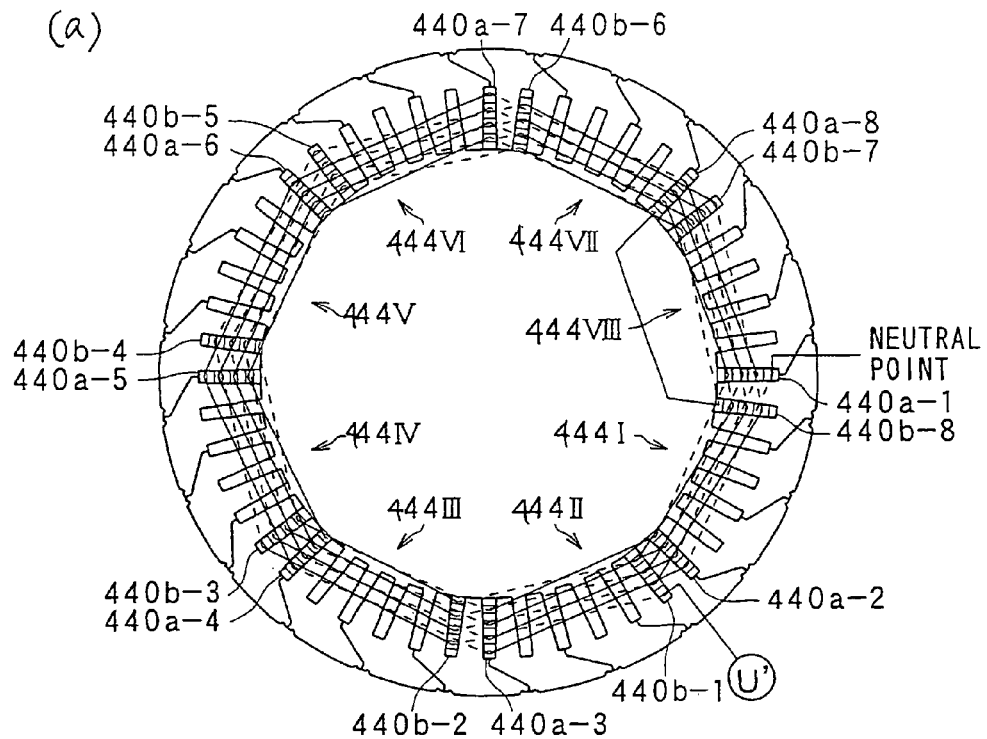
(a)
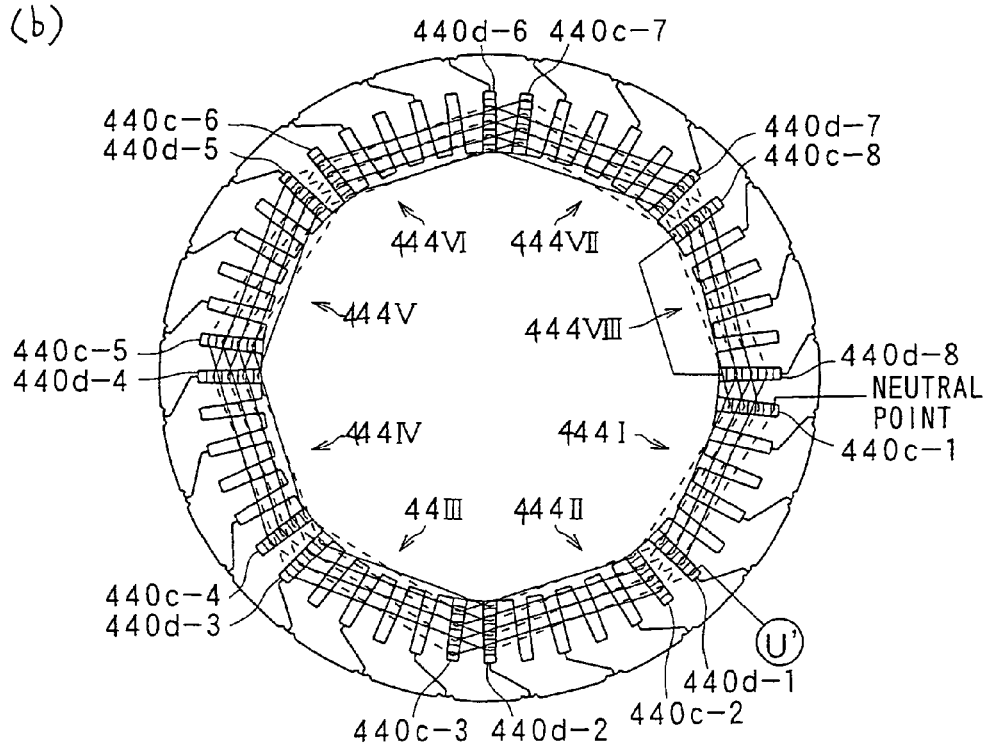
(b)

STATOR FOR ROTARY ELECTRIC MACHINE AND ROTARY ELECTRIC MACHINE USING SAME

CROSS REFERENCE TO RELATED APPLICATIONS

This application is a division of application Ser. No. 12/529,651, filed Sep. 2, 2009, which is the US National Phase Application of PCT/JP2008/053811, filed Mar. 4, 2008, which designated the US and claims priority to Japanese Patent Application Nos. 2007-054564, filed on Mar. 5, 2007, 2007-266849, filed Oct. 12, 2007, and 2008-052528, filed Mar. 3, 2008, the entire contents of which are incorporated by reference.

TECHNICAL FIELD

The present invention relates to a stator for a rotary electric machine and a rotary electric machine using the same.

BACKGROUND ART

What are disclosed in patent documents 1 and 2 as rotary electric machines working as an electric motor and an electric generator or used only as the electric motor or the electric generator. In both the patent documents 1 and 2, so-called segment conductors (SC) configured in the form of substantially U-shape are disposed in slots of a stator core. Open ends of the segment conductors are electrically joined to make stator windings.

However, in the patent document 1, the segment conductor is twisted at the center of the turned portion to insert it into the circumferentially different slots, thus giving rise to the problem that the height h of portions of the stator windings 310, as illustrated in FIG. 24, which protrude outside axial opposite ends of the stator core 300 (portions of the stator windings protruding from the stator core in the axial direction will be referred to as coil ends below) is great, so that the stator windings 310 overhang greatly from the stator core 300. As illustrated in FIG. 25, the height h of the coil ends depends upon the interval between the slots 302 in which the segment conductors 320 are disposed and a bend angle of the segment conductors 320 at the coil ends. The bend angle of the segment conductor 320 depends upon the thickness thereof and a coil interval. In other words, the height h of the coil ends depends upon the height of a triangle which has a base that is an interval between the slots 302 in which the segment conductor 320 is disposed and a basic angle that is the bend angle of the segment conductor 320.

In the patent document 2, as illustrated in FIG. 25, the crank-shaped portion 322 which does not twist is formed at substantially the center of the turned portion of the segment conductor 320 to flatten the center, thereby decreasing the height of the coil ends.

However, if interval between the slots 302 in which the segment conductor 320 is disposed and the thickness of the segment conductor 320 are identical between the patent documents 1 and 2, the triangle defined by the segment conductor 320 on the coil end will be the same in size of the base and basic angle thereof between the patent documents 1 and 2. Therefore, there is a limitation of decreasing the height of the coil ends even when the segment conductors of the patent document 2 are used.

Patent Document 1: Japanese Patent First Publication No. 11-285216
Patent Document 2: Japanese Patent First Publication No. 2003-18778

DISCLOSURE OF THE INVENTION

Problem to be Solved by the Invention

The invention was made in order to solve the problem. It is an object to decrease the height of coil ends of a stator winding which protrude from a stator core.

Means for Solving Problem

In an embodiment of the invention, steps which extend along an end surface of a stator core are formed at sections of turned portions protruding from slots. This causes the interval between the protruding sections of the turned portion to be smaller than the interval between the slots in which wire is disposed, thus resulting in a decrease in shape of the wire overhanging from the stator core which leads to a decrease in height of the coil ends.

In an embodiment of the invention, the steps which extend along the end surface of said stator core are formed at all the sections of the turned portion protruding from the slots. This results in a decrease in overall configuration of the coil ends protruding from the stator core.

The length of the protruding sections of the turned portions along the end surface of the stator core may be smaller than or equal to the interval between the slots adjacent in the circumferential direction. This avoids the interference of the protruding sections of the turned portion with the turned portions protruding from the circumferentially adjacent slot, thus eliminating the need for increasing the height of the coil ends or the radial width of the coil ends in order to avoid the interference.

The turned portions may be shaped stepwise to have the steps, which are parallel to the end surface of the stator core, in an axial direction of the stator core. The plurality of steps, therefore, decrease the height of the coil ends further.

The length of all the steps parallel to the end surface of the stator core may be smaller than or equal to the interval between the slots adjacent in the circumferential direction. This avoids the interference of the protruding sections of the turned portion with the turned portions protruding from the circumferentially adjacent slot, thus eliminating the need for increasing the height of the coil ends or the radial width of the coil ends in order to avoid the interference.

In an embodiment of the invention, if the number of phases of the stator windings is k, and the number of the slots for each phase per pole of a rotor having a plurality of magnetic poles different alternately in the circumferential direction is n, the number of the steps formed at the turned portion is k×n. If the number of phases of the stator windings is k, and the number of the slots for each phase per pole of the rotor is n, a total number of the slots per pole in which the stator windings of circumferentially adjacent k-phases are wound will be k×n. The wire extending over the circumferentially different slots is, therefore, disposed in the slots which are located away from each other by k×n slots. It is, therefore, necessary to have the k×n steps at the turned portion in order to avoids the interference between wires extending from the circumferentially adjacent slots. The interference between the wires is avoided by and the height of the coil ends is decreased by forming the k×n steps.

The turned portions may have a crank-shaped crank portion formed at a location farthest away from the stator core. The crank portion may be formed in parallel to the end surface of the stator core. This results in a decrease in height of the turned portion of the wire extending outside the stator core as compared with when the turned portion is twisted at substantially the middle thereof, which leads to a decrease in height of the coil ends.

In an embodiment of the invention, the crank portion is shifted in a radial direction of the stator core by the width of the wire. This enables the multi-phase stator windings to be made by shifting the wires in the radial direction by the width thereof and winding them without any clearance. This permits the radial width of the multi-phase stator windings to be decreased. The structure in which the wires are shifted by the width also includes that in which they are shifted by approximately the width.

In an embodiment of the invention, each of the turned portions is laid to overlap a circumferentially adjacent one of the turned portions in the axial direction. This results in a decrease in height of the coil ends.

In an embodiment of the invention, the turned portion is shaped stepwise to have an axial distance between the crank portion and an uppermost step that is one of the steps defining a stepwise shape which is farthest from the stator core in the axial direction is longer than the axial distance between the steps. This avoids the interference of one of the turned portions overlapping another one.

In an embodiment of the invention, the crank portion is laid to axially overlap the uppermost step of a circumferentially adjacent one of the turned portions. This results in a decrease in height of the coil ends without any interference.

In an embodiment of the invention, distances between the steps of the turned portion is equivalent to a height of the wire, thus avoiding the presence of a clearance between the phase windings at the steps when one of the turned portions overlaps another one in the axial direction. The structure in which the distances between the steps are equivalent to the height of the wire includes that in which the distances are substantially equal to the height of the wire.

The wire may have a rectangular section.

In an embodiment of the invention, the wire is formed to continue over an entire circumference of the stator core, thus minimizing electric connections between the wires. This results in a decrease in production cost of the multi-phase stator windings and minimizes occurrence of failure of the electric connections arising from corrosion thereof.

In an embodiment of the invention, the wire has a conductor and an insulating film wrapped about the conductor, the insulating film having a thickness of 100 to 200 μm. In this case, the outer periphery of the conductor of the wire is covered with the insulating film of 100 to 200 μm in thickness, thus eliminating the need for interleaving insulating sheet between the wires in order to ensure the insulation therebetween.

In an embodiment of the invention, the insulating film has an inner layer and an outer layer covering the inner layer. The outer layer is lower in glass-transition temperature than the inner layer. Therefore, the heat produced in the rotary electric machine will cause the outer layer to be solidified earlier than the inner layer, so that the hardness of the surface of the outer layer is increased, thereby providing the scratch resistance to the wire 30. This ensures the insulation of the wires subjected to machining to form the steps at the turned portions.

In an embodiment of the invention, the wire has a fusing material covering an outer periphery of the insulating film. The fusing material, as referred to herein, is material which will fuse when heated and be solidified when cooled. The wires disposed in the same slot are thermally bonded through the fusing material, thus causing the wires in the same slots to be integrated to improve the mechanical strength of the wires in the slots.

Usually, copper is used in conductors of the rotary electric machine in order to decrease the electric resistance. This is because the use of copper results in a relatively small in electric resistance.

In contrast to this, in an embodiment of the invention, the conductor of the wire is made of aluminum. The height of the coil ends is, as described above, decreased to decrease the shape of the wire as a whole, thus permitting the same electric resistance as in copper to be ensured in use of aluminum. The use of aluminum soften the wires more than in the use of copper, thus facilitating machining of the wires.

While the invention of the stator of the rotary electric machine was described, it may be embodied as a rotary electric machine equipped with the stator, as described above. In this case, the same effects as described above are provided.

In an embodiment of the invention, all the turned portions have the steps parallel to the end surface of the stator core. This permits the height of the coil ends to be decreased.

BRIEF DESCRIPTION OF THE DRAWINGS

FIG. 8 is a specification view of windings for one phase;

FIG. 14 is a sectional view which shows the structure of each phase winding constituting a coil of a rotary electric machine of the fourth embodiment;

FIG. 21 is a view which shows U-phase connections of a coil of a rotary electric machine of the fourth embodiment;

DESCRIPTION OF REFERENCE NUMBERS

| | | |
|---|---|---|
| 10: stator, | 12: stator core, | 13: end surface |
| 14, 15: slot | 20: stator winding | 30: wire |
| 32: conductor | 34: inner layer | 36: outer layer |
| 37: fusing material | 40: in-lost portion | 42: turned portion |
| 44: crank portion | 46: step | |
| 48: step | 50: input portion | |
| 52: neutral point | 54: connecting portion | |
| 60: rotor | 70: wire | 72: in-slot portion |
| 74: turned portion | 76: crank portion | |
| 78: step | 300: stator core | 302: slot |
| 310: stator winding | 320: segment conductor | |
| 322: crank-shaped portion | 330: turned portion | |
| 401: rotary electric machine | 420: rotary shaft | |
| 430: stator core | 431: slot | 432: core segment |
| 440: winding | 441: conductor | 442: insulating coating |
| 442a: inner layer | 442b: outer layer | 443: in-slot portion |
| 444: turned portion | 444A: crank | |
| 444B: uppermost step | 444C: second step | 444D: third step |
| 448: fusing material | | |

BEST MODES OF THE INVENTION

Embodiments of the invention will be described below based on drawings.

First Embodiment

Figure 3A:
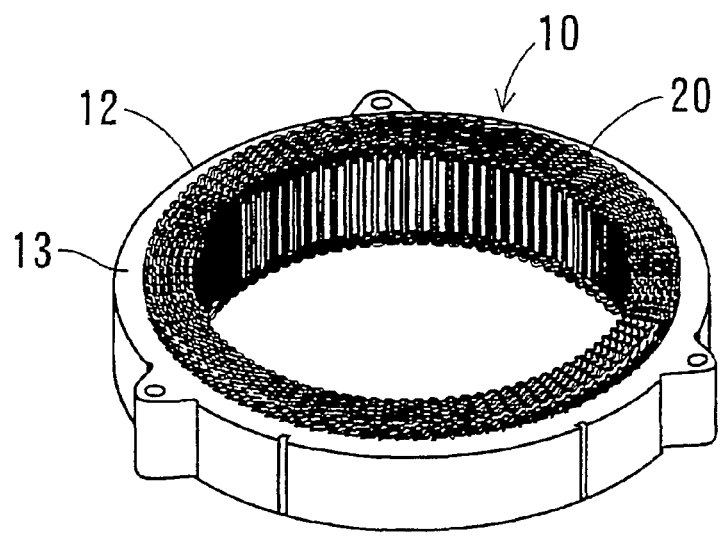
FIG. 3(A) is a perspective view which shows a stator.
Figure 3B:
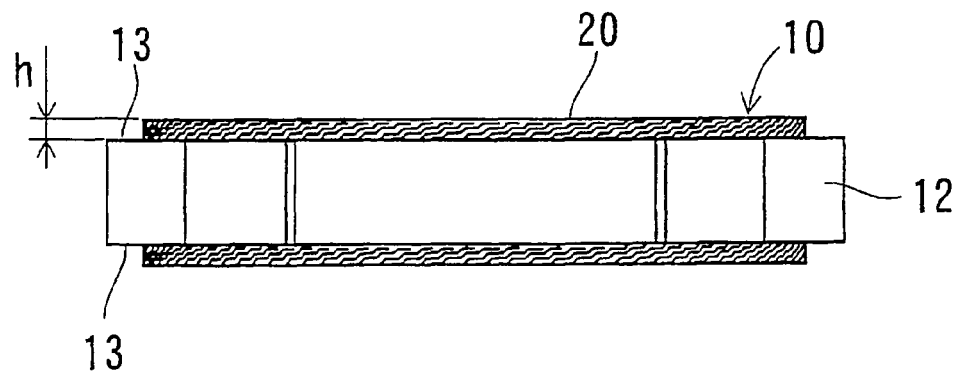
FIG. 3(B) is an illustration of a stator, as viewed from a lateral direction.

A stator of the first embodiment of the invention is shown in FIG. 3. The stator 10, as illustrated in FIG. 3, is used in, for example, rotary electric machines working as an electric motor and an electric generator for vehicles. The stator 10 has a rotor 60 (see FIG. 6) retained inside an inner periphery thereof to be rotatable. The rotor 60 has a plurality of permanent magnets arrayed on an outer circumference thereof facing an inner circumference of the stator 10. A stator core 12 is made of annular magnetic steel plates which have a given thickness and are staked in an axial direction. The stator core 12, as can be seen from FIG. 1, has a plurality of pairs each consisting of slots 14 and 15 extending in the axial direction and located adjacent in a circumferential direction. The pairs are arrayed at an inner peripheral side in the circumferential direction of the stator core 12. Stator windings 20 are three-phase windings each of which is disposed in the pair of slots 14 and 15 arrayed adjacent in the circumferential direction. The stator windings 20 are disposed, each phase in one of the three pairs of slots 14 and 15 which are located adjacent in the circumferential direction.

Figure 2A:
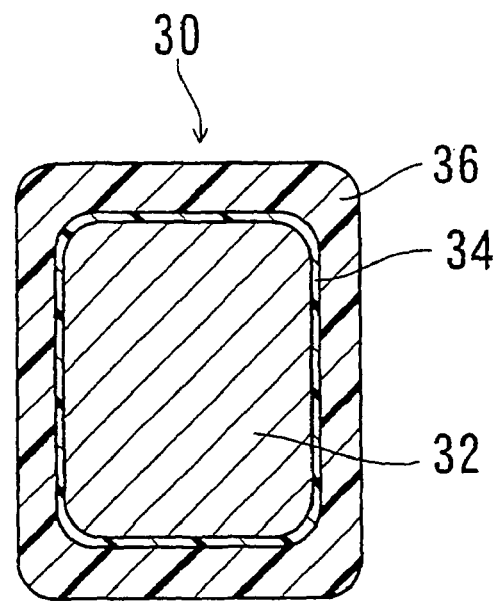
FIG. 2(A) is a sectional view of wire.

Each of wires 30 of the stator windings 20 is, as illustrated in FIG. 2(A), made of a copper conductor 32 and an insulating film wrapped about the conductor 32 to insulate the conductor 32 electrically. The insulating film includes an inner layer 34 and an outer layer 36. The inner layer 34 covers the outer periphery of the conductor 32. The outer layer 36 covers the outer periphery of the inner layer 34 fully. A total thickness of the insulating film including thicknesses of the inner and outer layers 34 and 36 is 100 μm to 200 μm. The use of the insulating film having a thickness of 100 μm or more ensures the insulation between the wires 30 even when used in high-voltage rotary electric machines such as automotive drive motors. The use of the insulating film having a thickness of 200 μm or less ensures the space factor of the stator. Such a great thickness of the insulating film made up of the inner layer 34 and the outer layer 36 eliminates the need for insulating the wires 30 electrically from each other using insulating paper.

The outer layer 36 is made of insulating material. The inner layer 34 is made of insulating material such as thermoplastics resin which is higher in glass-transition temperature than the outer layer 36 or polyamide. Therefore, when subjected to heat, as produced in the rotary electric machine, the outer layer 36 is solidified earlier than the inner layer 34, so that the hardness of the surface of the outer layer 36 will be increased, thereby providing the scratch resistance to the wire 30. This ensures the insulation of the wires 30.

Figure 2B:
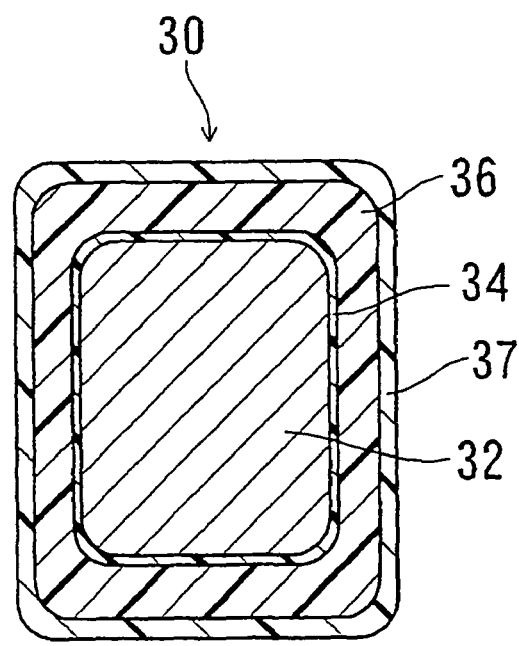
FIG. 2(B) is a sectional view of wire.

Further, the wire 30 of the stator winding 20, as illustrated in FIG. 2(B), has the insulating film which is made up of the inner layer 34 and the outer layer 36 and covered at the outer periphery thereof with fusing material 37 such as epoxy resin, thereby causing the fusing material 37 to melt earlier than the insulating film when subjected to the heat generated in the rotary electric machine, so that the wires 30 disposed in the same slot 14 are thermally bonded to each other through the fusing materials 37. The windings 30 in the same slot 14 are, therefore, change into a one-piece winding, thus resulting in an increase in mechanical strength of the wires 30 in the slots 14. The wires 30 may alternatively be made not to be covered with the fusing material 37.

Figure 1A:
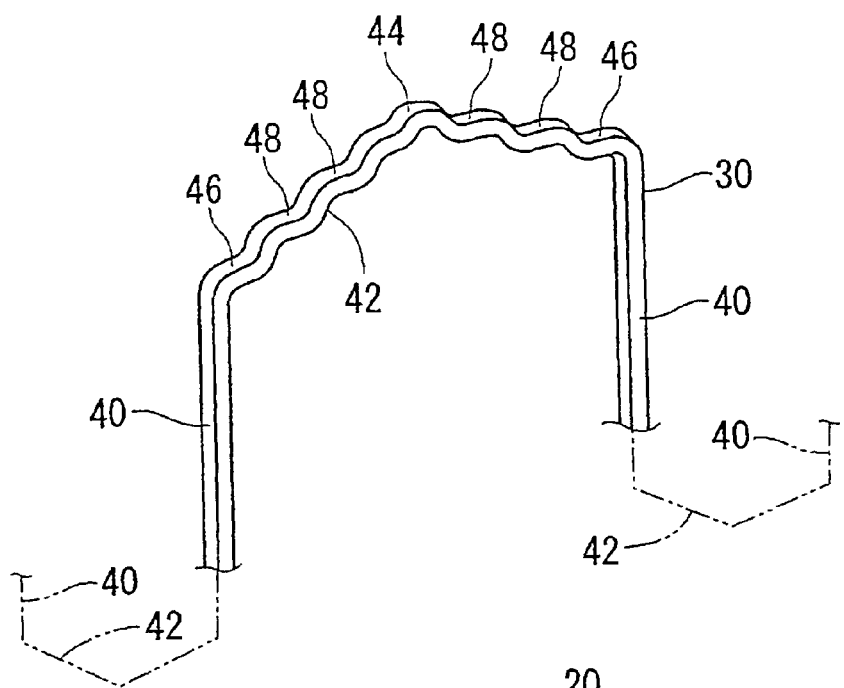
FIG. 1(A) is a perspective view which shows the shape of wire in the first embodiment.
Figure 1B:
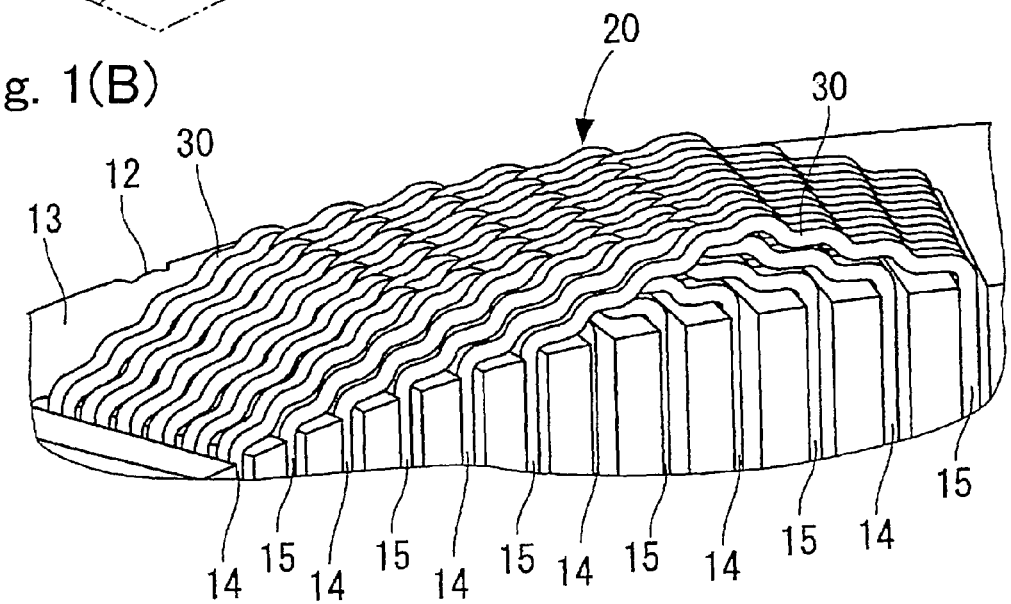
FIG. 1(B) is a perspective view which shows a stator winding wound around a stator core.

The wire 30 includes, as illustrated in FIG. 1, in-slot portions 40 to be disposed in the slots 14 and 15 of the stator core 12 and the turned portions 42 which extend from the slots 14 and 15 outside the stator core 12 and connect between the in-slot portions 40 respectively disposed in the slots 14 and 15 arrayed in the circumferential direction. The wire 30 is wound around the stator core to form the stator winding 20. The turned portions 42 are formed on both axial sides of the stator core 12. The turned portion 42 has formed on a substantially middle thereof a crank portion 44 which is not twisted. The crank portion 44 is made to have a cranked shape at a section of the turned portion 42 which is farthest away from the stator core and extends in parallel to the end surface 13 of the stator core 12. The amount of offset of the crank portion 44 provided by the form of a cranked shape is substantially within the width of the wire 30, thereby enabling the turned portions 42 of the radially adjacent wires 30 to be wound tightly. This results in a decrease in radial width of the coil ends, thus avoiding the overhanging of the stator windings 20 in the radial direction.

Figure 5:
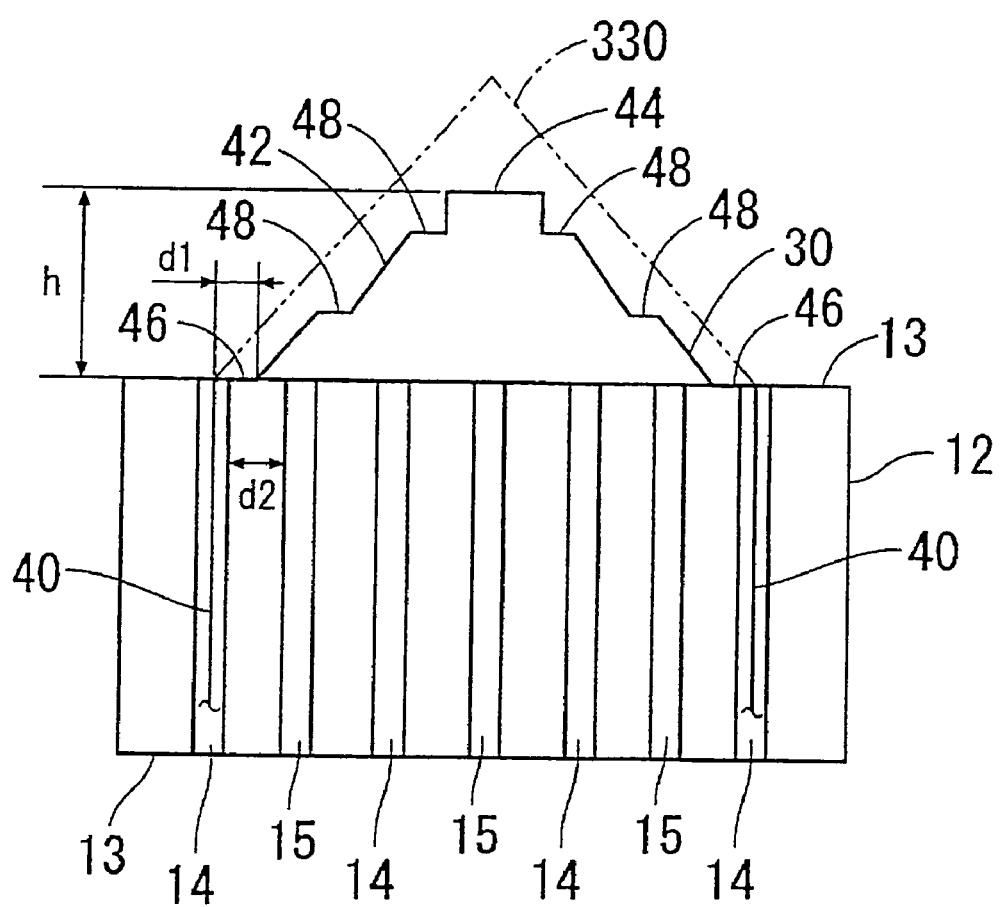
FIG. 5 is a schematic view which shows the shape of a coil end of wire.

Protruding sections of the turned portion 42 protruding outside the stator core 12 from the slots 14 and 15 have steps 46 oriented to the slots, through which the wire 30 extends, along the end surface 13 on either axial side of the stator core 12. This causes the interval between the protruding sections of the turned portion 42 of the wire 30, as illustrated in FIG. 5, protruding from the slots 14 or 15, in other words, the base of a triangle, as defined by the turned portion 42, to be smaller than the interval between two of the slots 14 or 15 in which the wire 30 is disposed, thus resulting in a decrease in height h of the coil end. The steps 46 which extend along the end surface 13 on the axial ends of the stator core 12 are formed at the protruding sections of all the turned portions 42, thus resulting in a decrease in overall shape of the wire 30.

If the length of the steps 46 which extend along the end surface 13 of the stator core 12 is defined as d1, and the interval between adjacent two of the slots in the circumferential direction is defined as d2, a relation of d1≦d2 is met. This avoids the physical interference of the steps 46 of one of the wires 30 with the other wires 30 protruding from the circumferentially adjacent slots 14 or 15 without need for increasing the height of the coil ends in the axial direction of the stator core 12 or the width of the coil ends in the radial direction of the stator core 12, thus avoiding an increase in width of the coil ends in the width-wise direction thereof and resulting in a decreased height of the coil ends. The decrease in width of the coil ends in the width-wise direction also avoids the overhanging of the stator windings 20 in the radial direction.

The wire 30 also has two steps 48 formed between a crank portion 44 at a substantially middle of the turned portion 42 and each of the steps 46 formed at the protruding sections of the turned portion 42. Specifically, the turned portion 42 of the wire 30 on one of the end surfaces 13 of the stator core 12 opposed in the axial direction thereof has a total of six steps and one crank portion. This results in a decrease in height h of the turned portions 42 as compared with a triangular turned portion 330 having no steps and the crank portion. The steps 48 are identical in configuration with the steps 46 and extend substantially parallel to either of the end surfaces 13 of the stator core 12. Specifically, the turned portion 42 of the wire 30 is shaped stepwise to have a plurality of steps on both sides of the crank portion 44 in the axial direction of the stator core. The length of each of the steps 48 parallel to the axial opposite end surfaces 13 of the stator core 12 is smaller than or equal to the interval between circumferentially adjacent two of the slots 14 and 15. This avoids the interference of the protruding sections of the turned portion 42 with the turned portions 42 protruding from the circumferentially adjacent slots 14 and 15, which avoids an increase in height h of the coil ends or width of the coil ends in the radial direction thereof.

In the three-phase stator windings 20 of the first embodiment, the winding 30 of each phase per pole of the rotor is disposed in two of the slots 14 and 15. In other words, a total number of the slots per pole of the rotor of the stator windings 20 which are located adjacent continuously to each other in the circumferential direction is 3×2=6. The coil wire 30 is, thus, disposed in two of the slots 14 or 15 which are located six slots away from each other in the circumferential direction. Accordingly, in order to avoid the interference between the wires 30 extending outside the circumferentially adjacent slots using the crank portion 44 at the middle of the wire 30, the turned portion 42 is preferably designed to have the six (3×2) steps and one crank portion, as in the first embodiment.

In the first embodiment, the wire 30, as described above, has the six steps and the one crank portion formed on each of the axially opposite coil ends of the stator core 12, thereby decreasing the height and radial width of the coil end.

Figure 6:
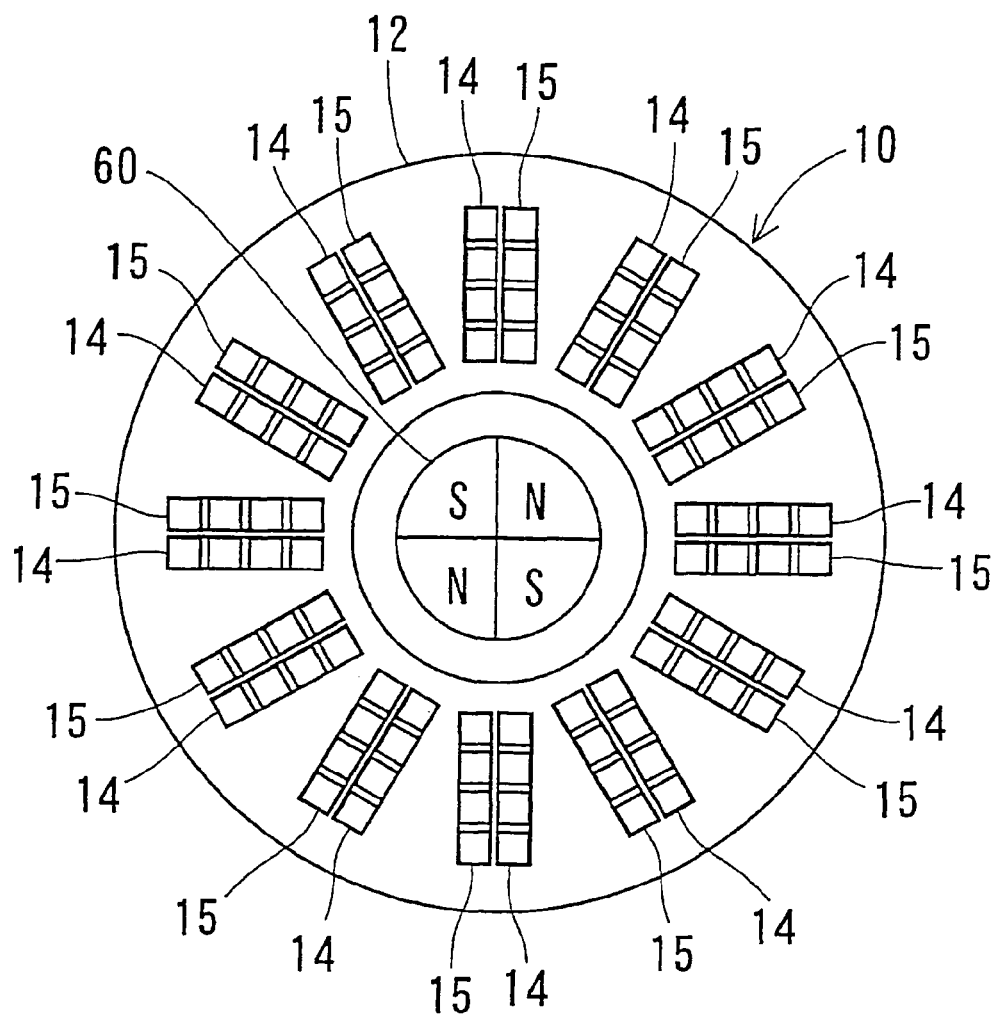
FIG. 6 is a schematic view which shows magnetic poles and the structure of slots of a rotary electric machine.
Figure 7:
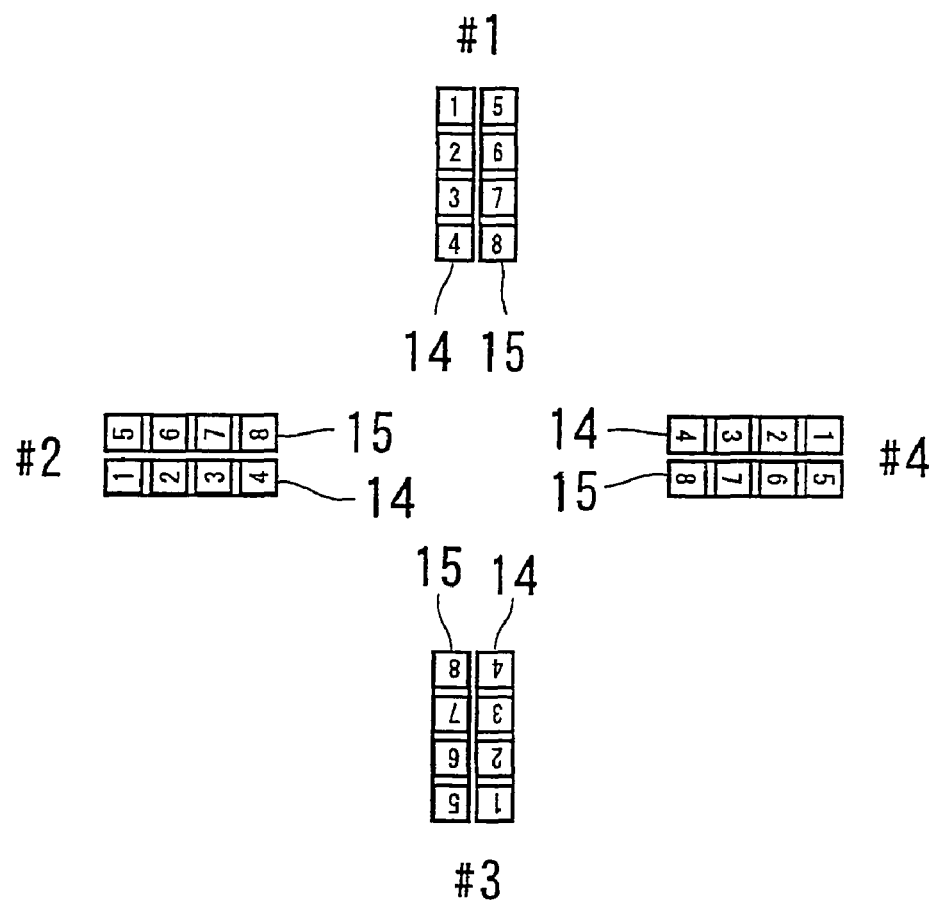
FIG. 7 is an explanatory view which shows the shape of coil ends for one phase.

Next, how to winding the stator windings 20 will be described below with reference to FIGS. 6 to 8. In FIGS. 6 to 8, the total numbers of poles of the rotor 60 and the slots of the stator core 12 are decreased for brevity of explanation. Assuming that the slots 14 and 15 are paired for each phase, the four pairs of the slots 14 and 15 are, as illustrated in FIG. 7, formed in the stator core 12 at an interval of 90°. The pairs of the slots 14 and 15 of the different phases are, therefore, formed at an interval of 30°. In the slots 14 and 15, a total of the eight in-slot portions 40 of the four wires 30 are disposed. Locations within the slot 14 of each pair where the wires 30 are disposed are numbered from one (1) to four (4) radially from outside to inside the slot 14. Locations within the slot 15 of each pair where the wires 30 are disposed are numbered from five (5) to eight (8) radially from outside to inside the slot 15.

Figure 4A:
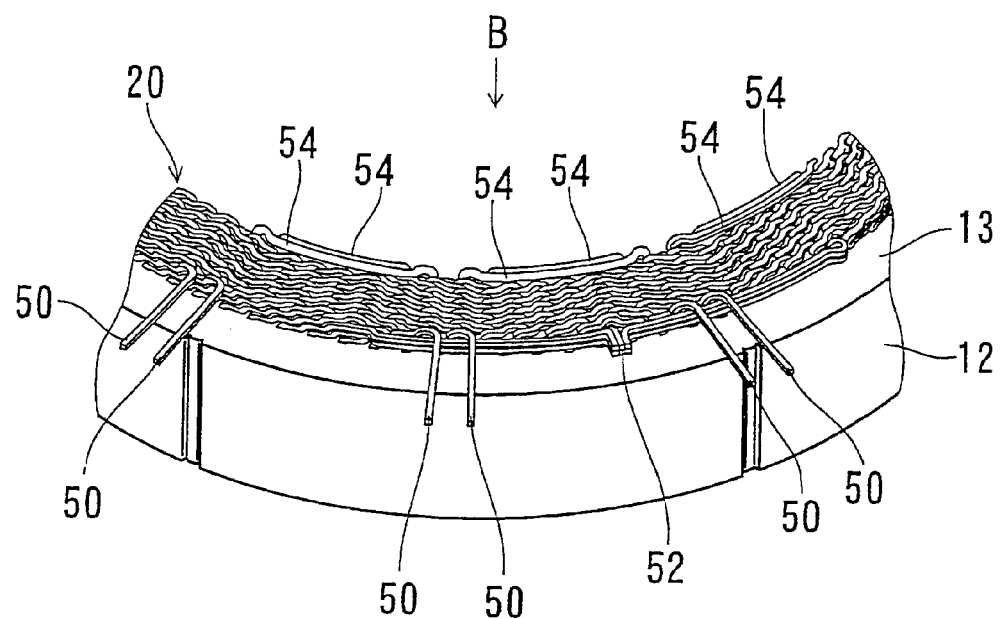
FIG. 4(A) is a perspective view which shows an input portion and a neutral point of a stator winding.
Figure 4B:
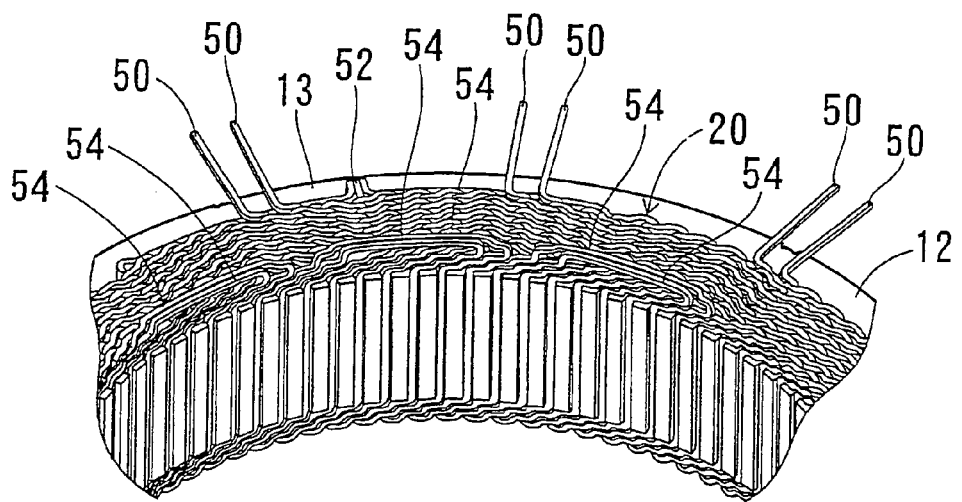
FIG. 4(B) is an illustration, as viewed from a B-direction in FIG. 4(A)

In FIG. 8, winding specifications of the stator winding 20 of one phase will be described. In FIG. 8, for example, "(1-4)" represents the winding 30 to be disposed in the location 4 of #1 in FIG. 7. As illustrated in FIG. 8, the wires disposed in the eight locations, as shown blow, of the slots 14 and 15 are joined continuously to form eight groups. The wires in the locations (1-1) and (1-5) are connected to the input portion 50 (see FIG. 4). The stator winding 20 of one phase has two winding ends in the location (4-1) and (4-5) as neutral points 52 (see FIG. 4). A total of the six neutral points 52 of the three phase-stator windings 20 are collected at one location, as illustrated in FIG. 4. In other words, the six neutral points 52 of the three-phase stator windings 20 of the first embodiment are star-connected.

(Group 1) (1-1)-(2-2)-(3-1)-(4-2)
(Group 2) (1-2)-(2-1)-(3-2)-(4-1)
(Group 3) (1-3)-(2-4)-(3-3)-(4-4)
(Group 4) (1-4)-(2-3)-(3-4)-(4-3)
(Group 5) (1-5)-(2-6)-(3-5)-(4-6)
(Group 6) (1-6)-(2-5)-(3-6)-(4-5)
(Group 7) (1-7)-(2-8)-(3-7)-(4-8)
(Group 8) (1-8)-(2-7)-(3-8)-(4-7)

The continuing wires of the eight groups are connected as follow. The wires (1-2) and (4-3), the wires (1-3) and (4-2), the wires (1-4) and (4-8), the wires (1-6) and (4-7), the wires (1-7) and (4-6), the wires (1-8) and (4-4) are connected respectively to form a pair of stator windings (#1) and (#2) joined in parallel by the continuing wires 30, as indicated by a broken line and a solid line in FIG. 8 which extend from the input portion 50 to the neutral points 52. Similarly, the other two-phase windings 20 each form a pair of the stator windings connected in parallel through the wires 30 continuing from the input portion 50 to the neutral points 52. Joints 54 of the wires (1-4) and (4-8) and the wires (1-8) and (4-4) for three phases are denoted by numeral 54 in FIG. 4.

STATOR WINDING #1
(INPUT PORTION)-(GROUP 1)-(GROUP 3)-(GROUP 8)-(GROUP 6)-(NEUTRAL POINT)
STATOR WINDING #2
(INPUT PORTION)-(GROUP 5)-(GROUP 7)-(GROUP 4)-(GROUP 2)-(NEUTRAL POINT)

The wires 30 continuing over the entire circumference of the stator core 12 to define the stator windings for one phase from the input portion 50 to the neutral point 52, thereby minimizing electrical joints as compared with the case where known segment conductors are welded electrically to form stator windings continuing from the input portion 50 to the neutral point 52. This results in a decrease in manufacturing cost of the stator windings 20 and also minimizes poor electric connections of the stator windings 20.

In the first embodiment, the radial width of the coil ends is decreased, so that the coil ends do not hung over outward radially, thus enabling the neutral points 52 to be disposed radially outside the coil ends.

Second Embodiment

Figure 9A:
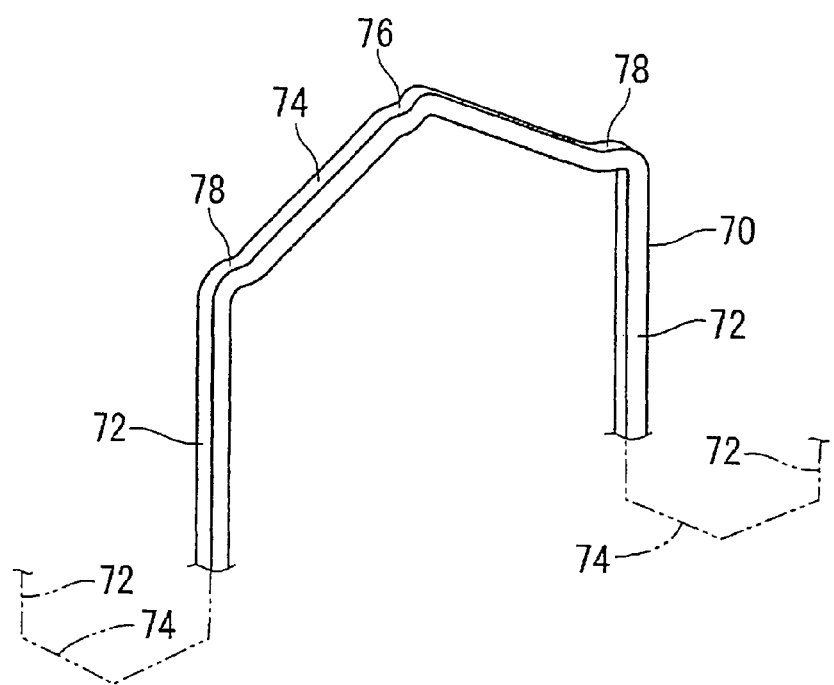
FIG. 9(A) is a perspective view which shows the shape of wire in the second embodiment.
Figure 9B:
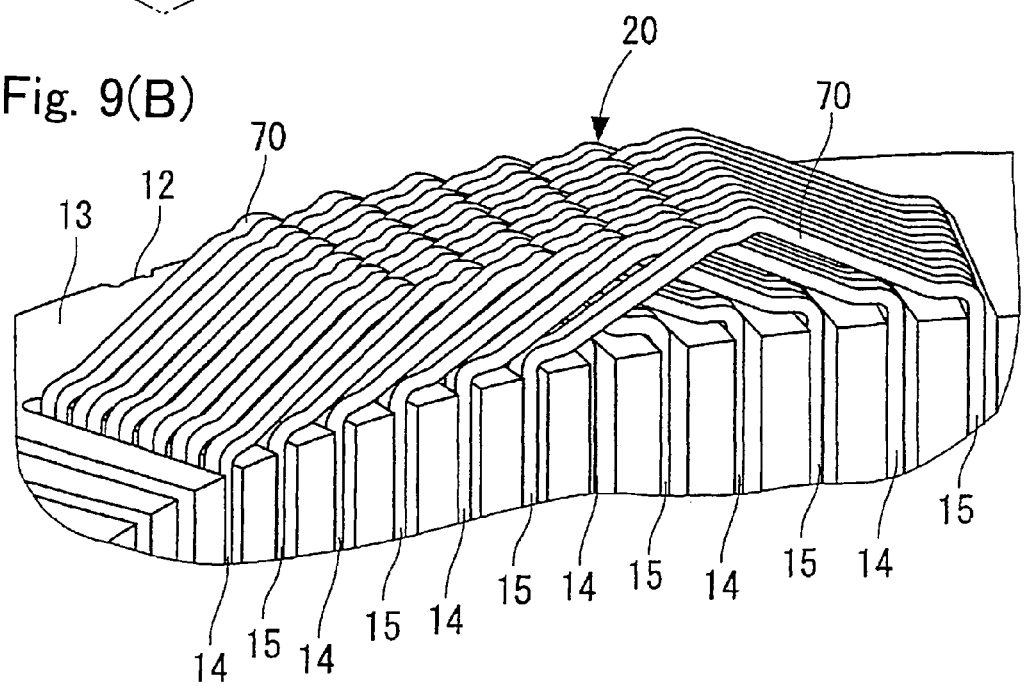
FIG. 9(B) is a perspective view which shows a stator winding wound around a stator core.

The second embodiment of the invention is illustrated in FIG. 9. The same reference numbers are attached to the same parts as in the first embodiment.

The wire 70 of the second embodiment, like in the first embodiment, has formed on a substantially middle of a turned portion 74 a crank portion 76 which is not twisted. Protruding sections of the turned portion 74 protruding outside the stator core 12 from the slots 14 and 15 have steps 78 oriented to the slots, through which in-slot portions 72 extend, along the end surface 13 of the stator core 12. However, the wire 70 of the second embodiment has a straight portion between the crank portion 76 at the middle of the turned portion 74 and each of the steps 78 formed on the protruding portions and does not have any steps.

In the structure of the wire 70, the length of the base of a triangle, as defined by the wire 70 protruding from the slots 14 and 15 is smaller than the interval between two of the slots 14 or 15 in which the wire 70 is disposed, thus resulting in a decrease in height h of the coil end.

Third Embodiment

In the above embodiments, the stator of the rotary electric machine in which the wires 30 and 70 of the stator windings 20 are formed by the conductors 32 made of copper was explained. In contrast, the wires 30 and 70 of this embodiment are made of aluminum. Aluminum is material which is greater in electric resistance than copper. However, the shape of the wires protruding from the stator core is decreased as a whole by narrowing the interval between the protruding sections of the turned portion further, thus resulting in a decrease in electric resistance of the whole of the stator windings. This permits the electric resistance of the whole of the stator windings to be substantially equivalent to that of the stator windings of the stator of the conventional rotary electric machine even if the wires 30 and 70 are made of aluminum. The ease with which the wires are machined may be facilitated by forming the conductors 32 by aluminum.

Fourth Embodiment

Figure 10:
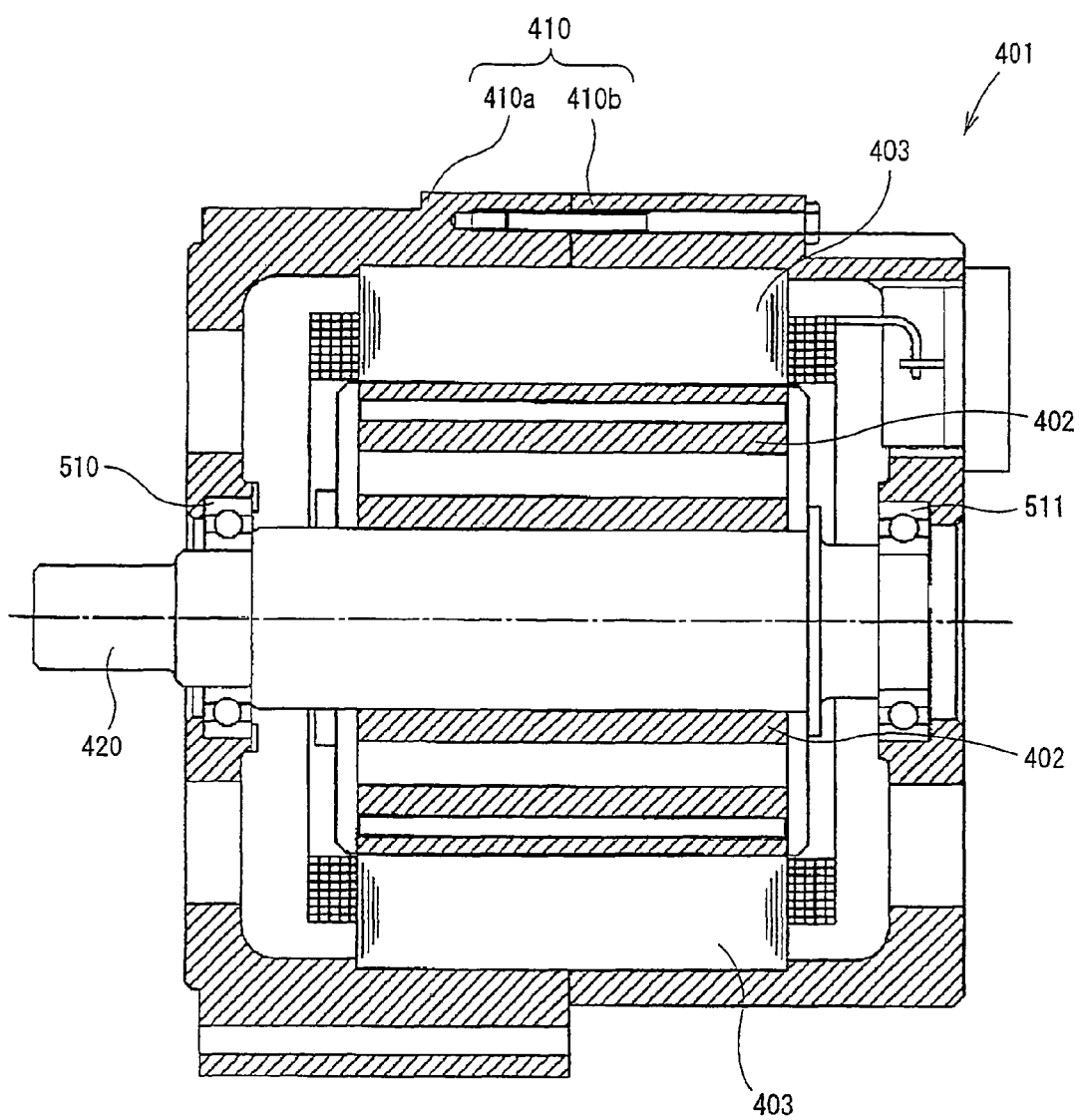
FIG. 10 is a view which shows the structure of a rotary electric machine according to the fourth embodiment.

The structure of a rotary electric machine 410 of the fourth embodiment is illustrated in FIG. 10. The rotary electric machine 410 of this embodiment is equipped with a housing 410 made by joining two bottomed cylindrical housings 410a and 410b at openings thereof, a rotor 402 secured to a rotary shaft 420 supported by the housing 410 through bearings 510 and 511 to be rotatable, and a stator 403 secured to the housing 410 at a location surrounding the rotor 402 within the housing 410.

The rotor 402 has a plurality of magnets disposed on an outer periphery thereof facing an inner periphery of the stator 403 to define magnetic poles different alternately in a circumferential direction thereof. The number of the magnetic poles of the rotor 402 depends upon the type of the rotary electric machine and should not be limited thereto. In this embodiment, the eight-pole (4 N-poles and 4 S-poles) rotor 402 is used.

Figure 11:
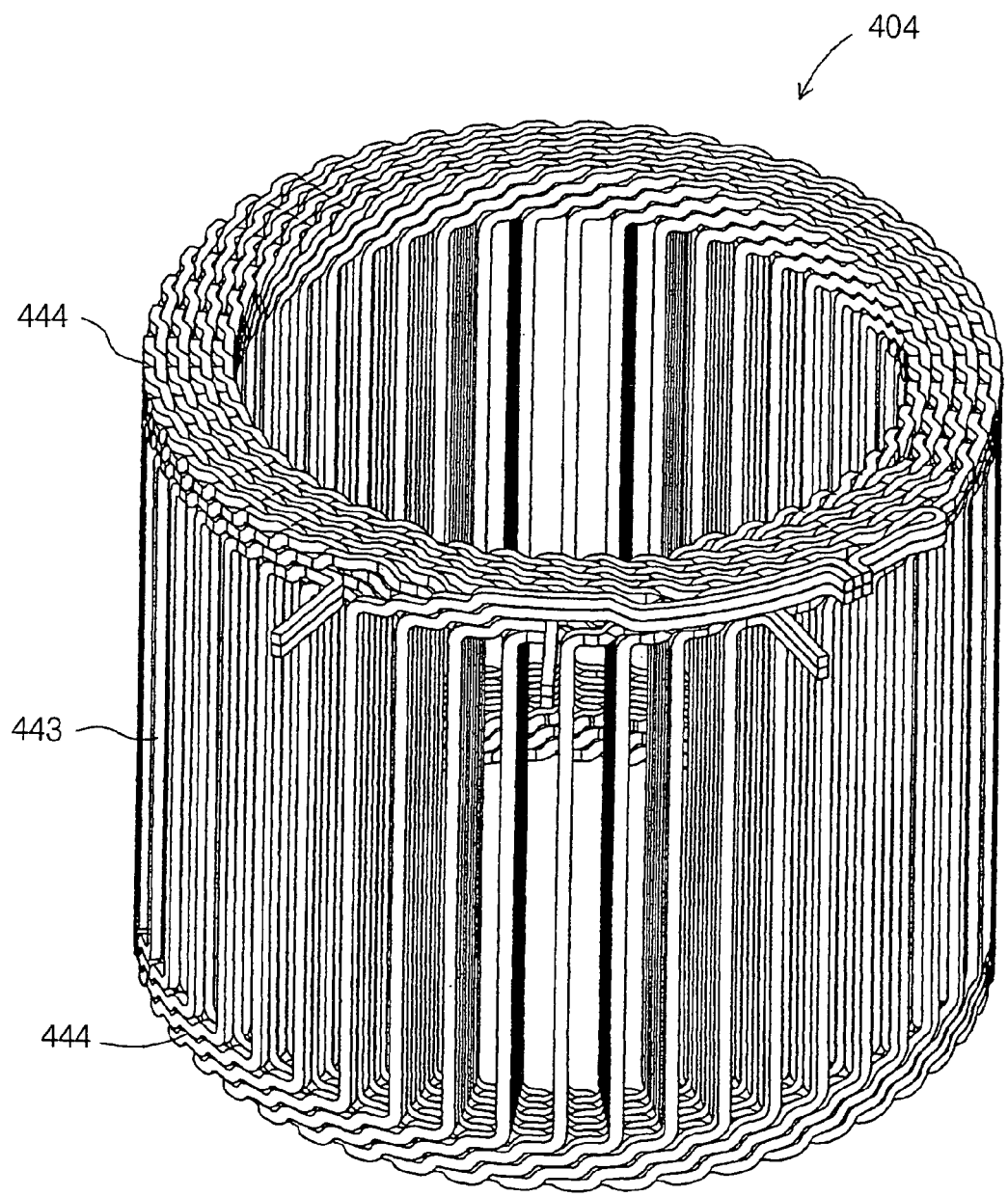
FIG. 11 is a perspective view which shows a coil of a rotary electric machine of the fourth embodiment.
Figure 12:
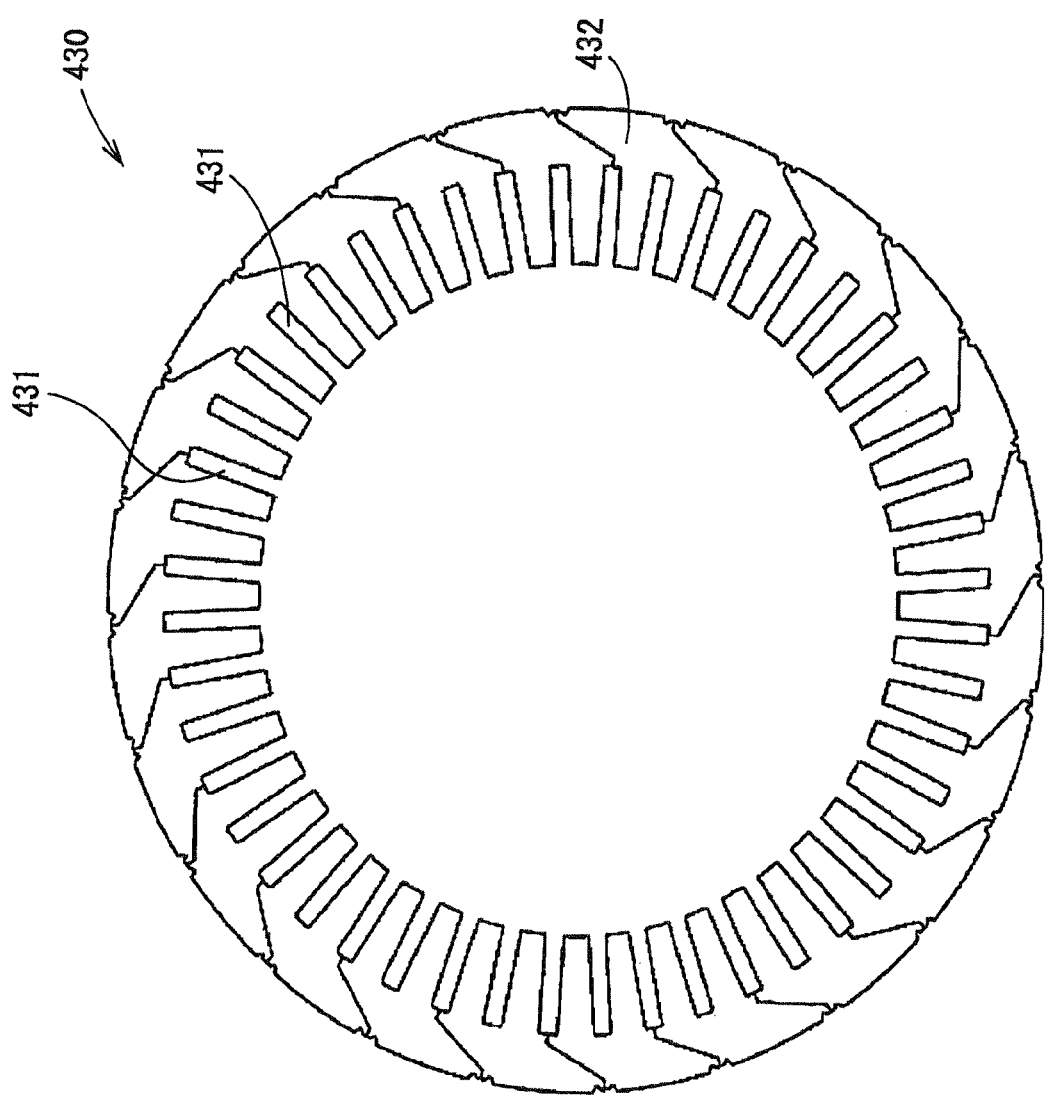
FIG. 12 is a view which shows a core of a stator of a rotary electric machine of the fourth embodiment.

The stator 403 has a structure equipped with a three-phase coil 404, as illustrated in FIG. 11, made up of a plurality of phase windings and a stator core 430, as illustrated in FIG. 12.

The stator core 430 is, as illustrated in FIG. 12, of an annular shape which has a plurality of slots 431 formed in an inner periphery thereof. The slots 431 are formed to have a depth-wise direction coincident with a radial direction of the stator core 430. The slots 431 are formed in the stator core 430 two for each of poles of the rotor 402 for each phase. Specifically, 8×3×2=48 slots 431 are formed.

Figure 13:
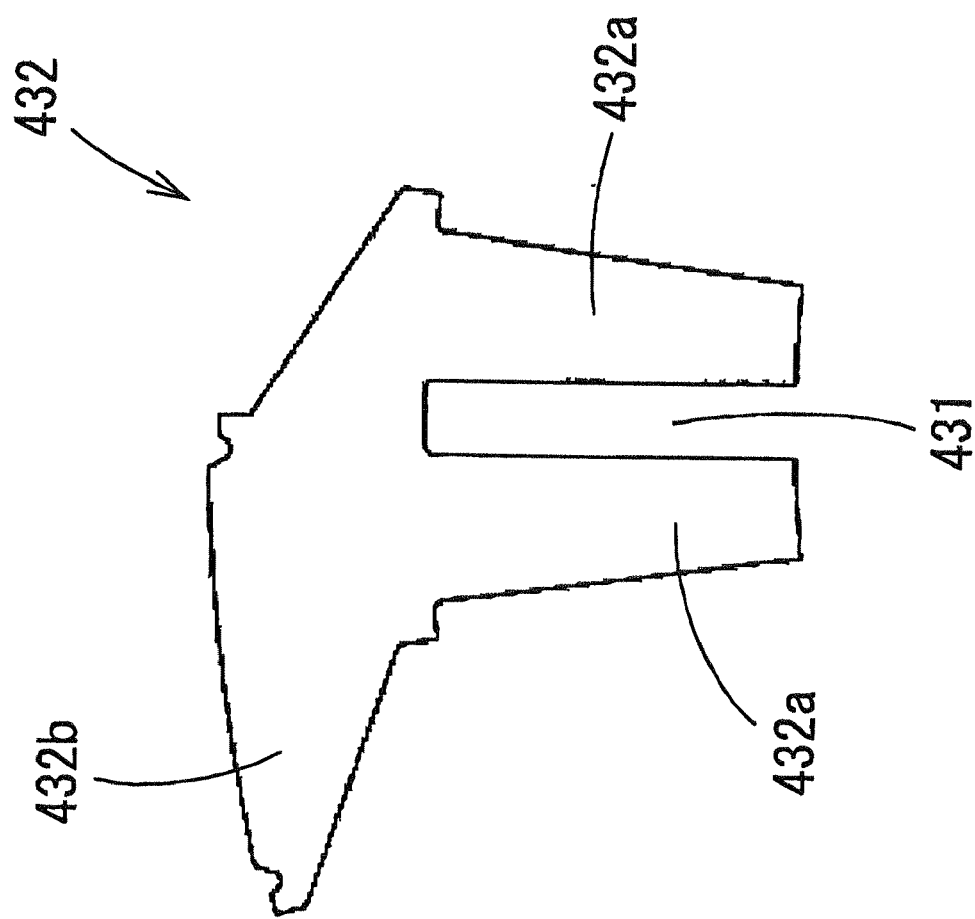
FIG. 13 is a view which shows core segments constituting a core of a stator of a rotary electric machine of the fourth embodiment.

The stator core 430 is made up of 24 core segments 432, as illustrate in FIG. 13, arrayed in a circumferential direction thereof. The core segment 432 defines one of the slots 431 and is so formed as to have a shape (teeth 432a extending in the radius direction and a core back 432b supporting the teeth 432a) which define two of the slots 431 along with left and right adjacent ones of the core segments 432.

The core segment 432 is made of a stack of a plurality of 410 magnetic steel sheets having a thickness of 0.3 mm. An insulating sheet is interposed between adjacent two of the magnetic steel sheets. The stator core 430 may alternatively be made of a stack of typically known metal sheets and insulating films.

The coil 404 is formed by winding a plurality of stator winding wires 440 in a given winding manner. The stator winding wires 440 forming the coil 404 are, as illustrated in FIG. 14(A), each made of a copper conductor 441 and an insulating film 442 which is wrapped about the outer surface of the conductor 441 and consists of an inner layer 442a and an outer layer 442b. A total thickness of the insulating film 442 (including thicknesses of the inner and outer layers 442a and 442b) is 100 μm to 200 μm. Such a great thickness of the insulating film 442 made up of the inner layer 442a and the outer layer 442b eliminates the need for insulating the stator winding wires 440 electrically from each other with insulating sheet interposed between the stator winding wires 440, but insulating sheet 405 may be interposed between the wires.

Further, the stator winding wire 440 of the coil 404, as illustrated in FIG. 14(B), may have a fusing material 448 made of epoxy resin with which the outer periphery of the insulating film 442 made up of the inner layer 442a and the outer layer 442b is covered. The fusing material 448, thus, melts earlier than the insulating film 442 when subjected to the heat generated in the rotary electric machine, so that the stator winding wires 440 disposed in the same slot 431 are thermally bonded to each other through the fusing materials 448. The stator winding wires 440 in the same slot 431, therefore, will change into a one-piece winding, thus resulting in an increase in mechanical strength of the stator winding wires 440 in the slots 431.

Figure 15:
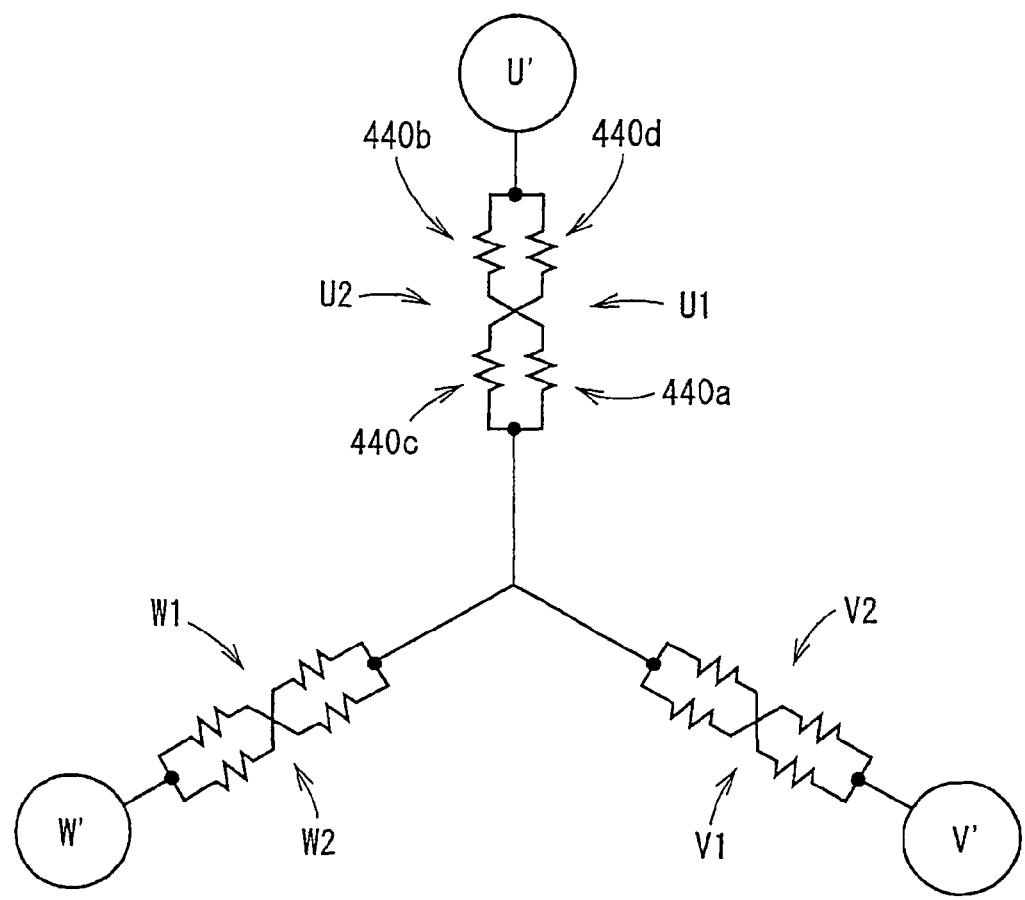
FIG. 15 is a which shows connections of a coil of a rotary electric machine of the fourth embodiment.

The coil 404 is, as shown in FIG. 15, fabricated by three phase windings (U1, U2, V1, V2, W1, W2). More specifically, a stator winding 440a defining a U1-phase and a stator winding 440b defining a U2-phase are joined in series. A stator winding 440c defining a U2-phase and a stator winding 440d defining a U1-phase are joined in series. The stator windings 440a and 440b are connected to the stator windings 440c and 440d in parallel to form a U-phase winding. Similarly, a V-phase and a W-phase winding are made in the same manner.

The stator winding wires 440 making the coil 404 are wave-wound on an inner circumferential side of the stator core 430 in the circumferential direction. The stator winding wire 440 has straight in-slot portions 443 to be disposed in the slots 431 of the stator core 430 and turned portions 444 each of which connects between adjacent two of the in-slot portions 443. The in-slot portions 443 are accommodated in every predetermined number of the slots 431 (every 3 phases× 2=6 slots in this embodiment). The turned portions 444 project from axially-opposed ends of the stator core 430.

In the coil 404, the turned portions 444 are formed on axial opposite sides of the stator core 430. The turned portion 444 has formed on a substantially middle thereof a crank portion which does not twist.

Figure 16:
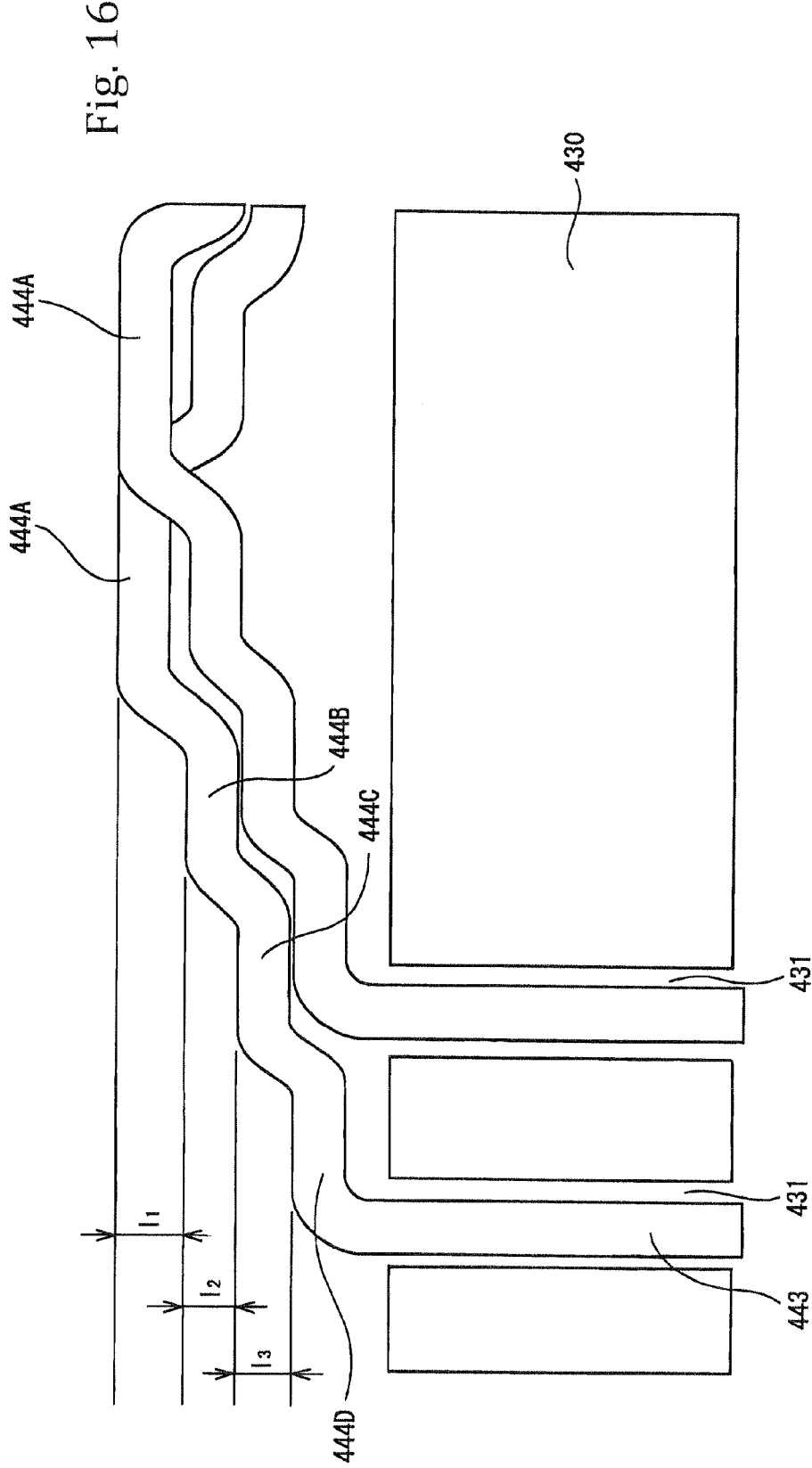
FIG. 16 is a view which shows turned portions of a stator of a rotary electric machine of the fourth embodiment.

As illustrated in FIG. 16, all protruding sections of the turned portion 444 protruding outside the stator core 430 from the slots 431 have steps 444D extending along the end surfaces of the stator core 430. In FIG. 16, the steps 444D are disposed away from the stator core 430, but however, may be placed in contact abutment with the stator core 430. The turned portions 444 are formed stepwise which have a plurality of steps parallel to the end surfaces of the stator core 430, thus avoiding the interference of the stepwise turned portions 444 of the stator winding wires 440 with the stator winding wires 440 protruding from the circumferentially adjacent slots 431. This avoids an increase in height of the coil ends or width of the coil ends in the radial direction thereof for eliminating the interference between the stator winding wires 440 protruding from the circumferentially adjacent slots 431. This results in a decrease in height and width of the coil ends to avoid the radially outward overhanging of the coil 404.

The stepwise turned portion 444 has the crank portion 444A at a section thereof which is farthest away from the stator core 430 (i.e. the highest portion). The crank portion 444A is formed in parallel to the end surface of the stator core 430. The amount of offset of the crank portion 444A in the radial direction of the stator core is substantially within the width of the stator winding wire 440. Specifically, the amount of offset is 1.0 to 1.3 times greater than the width of the stator core 440. The turned portion 444 of the stator winding wire 440 has stepwise sides opposed to each other across the crank portion 444A. The crank portion 444A is laid to vertically overlap the turned portion 444 of the stator winding wire 440 disposed in the adjacent slot 431.

The turned portion 444 is formed to have a four-step shape. Specifically, the turned portion 444 has the three steps 444B to 444D which extend parallel to the end surface of the stator core 430 and are formed at locations different in the axial direction of the stator core 430. The steps 444B to 444D extend parallel to the end surface of the stator core 430, but however, need not be parallel thereto exactly. The steps 444B to 444D may be parallel within a range in which the height of the coil ends is permitted to be lowered. In this embodiment, except the crank portion 444A which is farthest from the end surface of the stator core 430, the step 444C which is farthest therefrom will be referred to as the uppermost step 444B. The step 444C which is second farthest therefrom will be referred to as the second step 444C. The step 444D which is closest to the end surface of the stator core 430 will be referred to as the third step 444D. The length of a portion of each of the uppermost step 444B, the second step 444C, and the third step 444D which extends parallel to the end surface of the stator core 430 is smaller than or equal to the interval between circumferentially adjacent two of the slots 431.

In this embodiment, if the distance between the crank portion 444A and the uppermost step 444B is defined as $l_1$, the distance between the uppermost step 444B and the second step 444C is defined as $l_2$, and the distance between the second step 444C and the third step 444D is defined as $l_3$, a relation of $l_1 > l_2 = l_3$. For example, $l_1$ is 1.02 to 1.3 times greater than $l_2$. The distances $l_1$, $l_2$, and $l_3$ may meet a relation of $l_1 \geq l_2 = l_3$. The height of each of the steps 444B to 444D is substantially equivalent to the height of the stator winding wire 440. Specifically, such a height is 1.0 to 1.3 times greater than that of the stator winding wire 440. In this embodiment, the distances between the crank portion 444A and the steps 444B to 444D of the turned portion 444 are, as schematically illustrated in FIG. 16, defined based on the back surfaces thereof behind the stator core 430. In this embodiment, the stepwise formation of the turned portions 444 permits the turned portions 444 to be laid to overlap each other without any clearances therebetween, thereby winding the turned portions 444 tightly.

Further, in this embodiment, of the distances between the crank portion 444A and the steps 444B to 444D of the turned portion 444, the distance $l_1$ between the crank portion 444A and the uppermost step 444B is greater than the distances $l_2$ and $l_3$ between the steps 444B to 444D, thereby eliminating the interference of the crank portion 444 of one of the turned portions 444 with the stator winding wire 440 having the other turned portions 444 when they are laid to overlap each other. The inclination of a joint between the end of the crank portion 444A and the end of the uppermost step 444B is greater than that of a joint between the end of the uppermost step 444B and the second step 444C.

Figure 17:
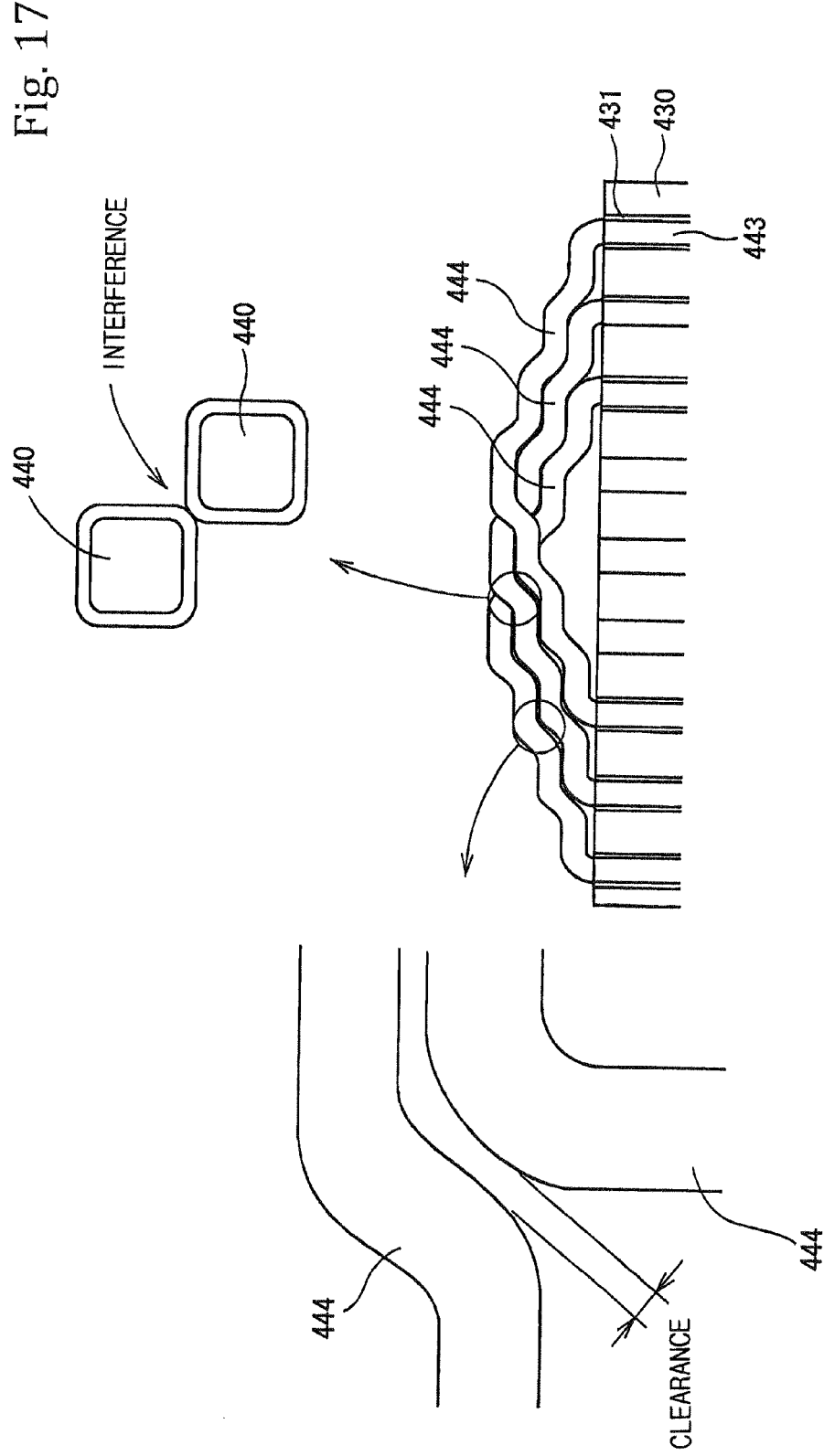
FIG. 17 is a view which shows the interference at turned portions.

When the distance $l_1$ between the crank portion 444A and the uppermost step 444B is smaller than the distances $l_2$ and $l_3$ between the steps 444B to 444D (i.e., $l_1 < l_2 = l_3$), it will, as illustrated in FIG. 17, cause corners of rectangular sections of the stator winding wires 440 forming the turned portions 444 extending one over another to make a contact or interference therebetween.

Although not limited, the distance between the third step 444D of the turned portion 444 and the end surface of the stator core 430 is preferably equivalent to about the height of the stator winding wire 440.

The coil 40 is designed so that the end of each of the stator winding wires 440 making the coil 404 protrudes radially outward within the height of the coil ends defined by the turned portions 444 projecting from the stator core 430. The ends of the respective stator winding wires 440 that are on the side of the neutral points protrude radially outward at a location higher than the other ends thereof.

Next, the winding of the stator cores 440 forming the coil 404 in this embodiment will be described below in detail using FIGS. 18 to 23.

Figure 18:
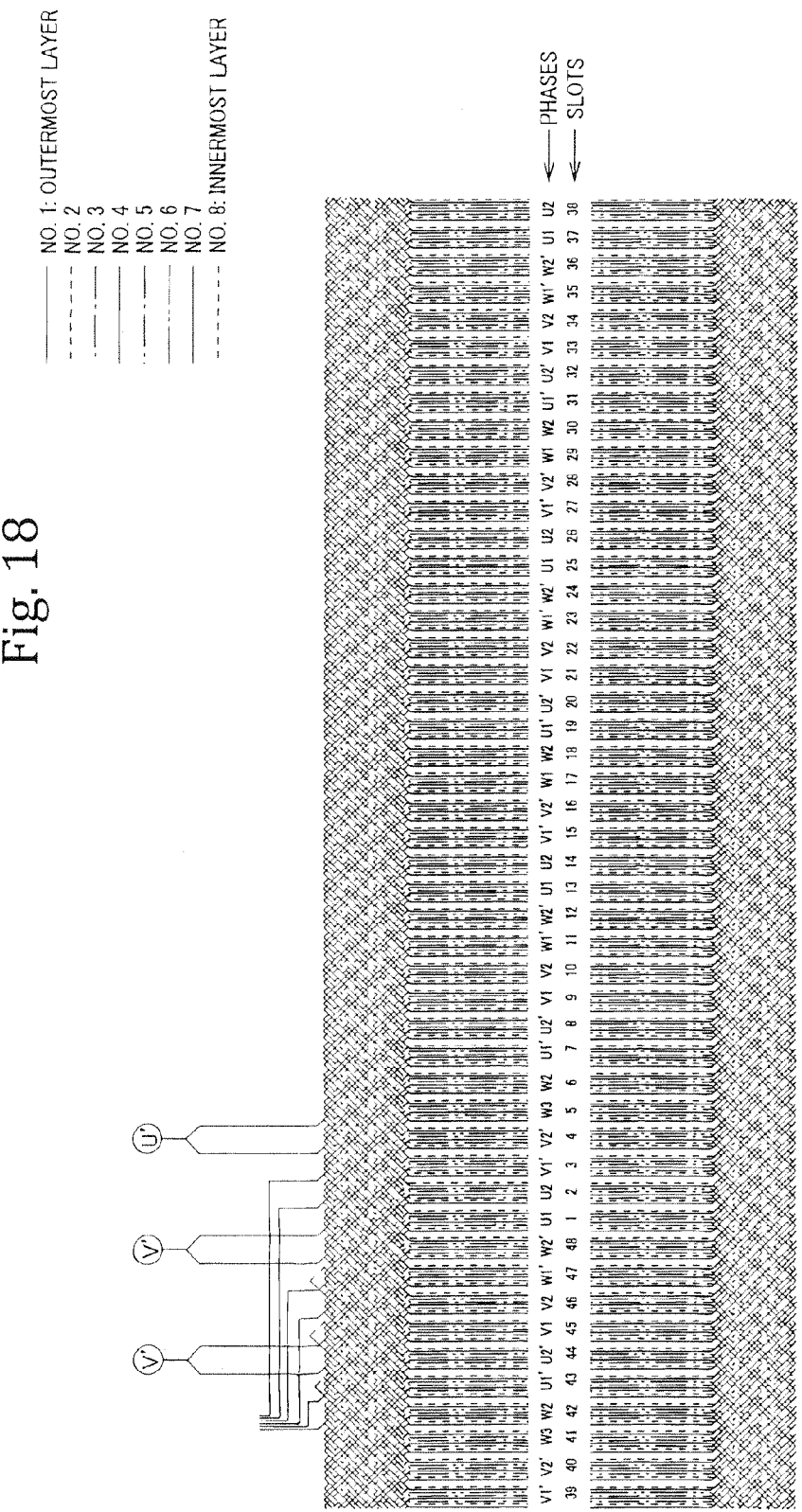
FIG. 18 is a view which shows connections of a coil of a rotary electric machine of the fourth embodiment.
Figure 19:
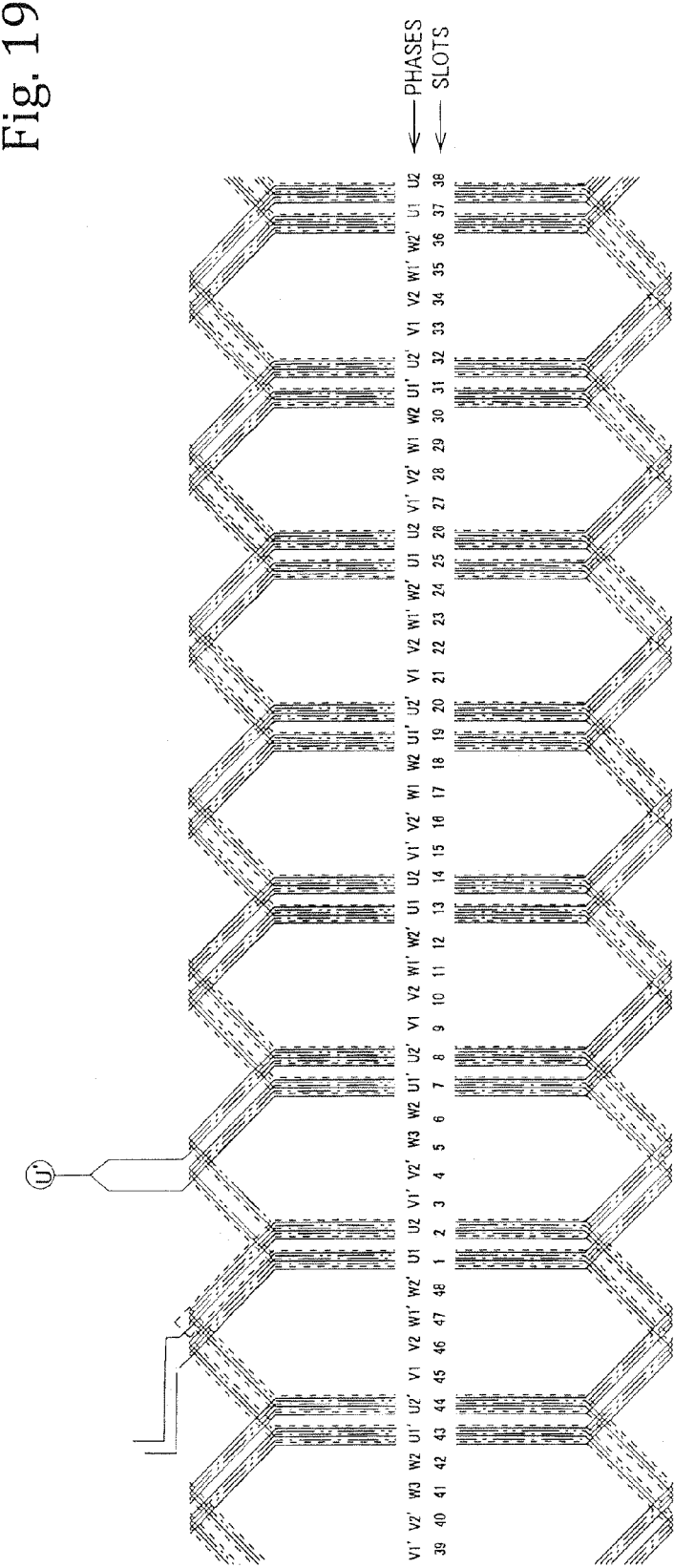
FIG. 19 is a view which shows U-phase connections of a coil of a rotary electric machine of the fourth embodiment.

The coil 404 of this embodiment is made up of the three-phase windings (U1, U2, V1, V2, W1, and W2) two pairs for each phase. FIG. 18 illustrates how to connect the three-phase windings. Slot numbers in FIG. 18 are as follows. The slot number 1 indicates one of the slots 431 in which one of the in-slot portions 443 which is closest to one of the ends of the U1-phase stator winding wire 440 on the side of the neutral point is disposed. The slot numbers 2, 3, 4, . . . conveniently indicates the slots 431 arrayed in the circumferential direction in which the stator winding wires 440 are wound. FIG. 19 demonstrates only the stator winding wires 440 forming the U-phase winding (i.e., the U1- and U2-phase windings), as illustrated in FIG. 18. In FIGS. 18 to 19, lines extending straight vertically indicate the in-slot portions 443. Lines extending obliquely upward or downward indicate the turned portions 444.

Figure 20:
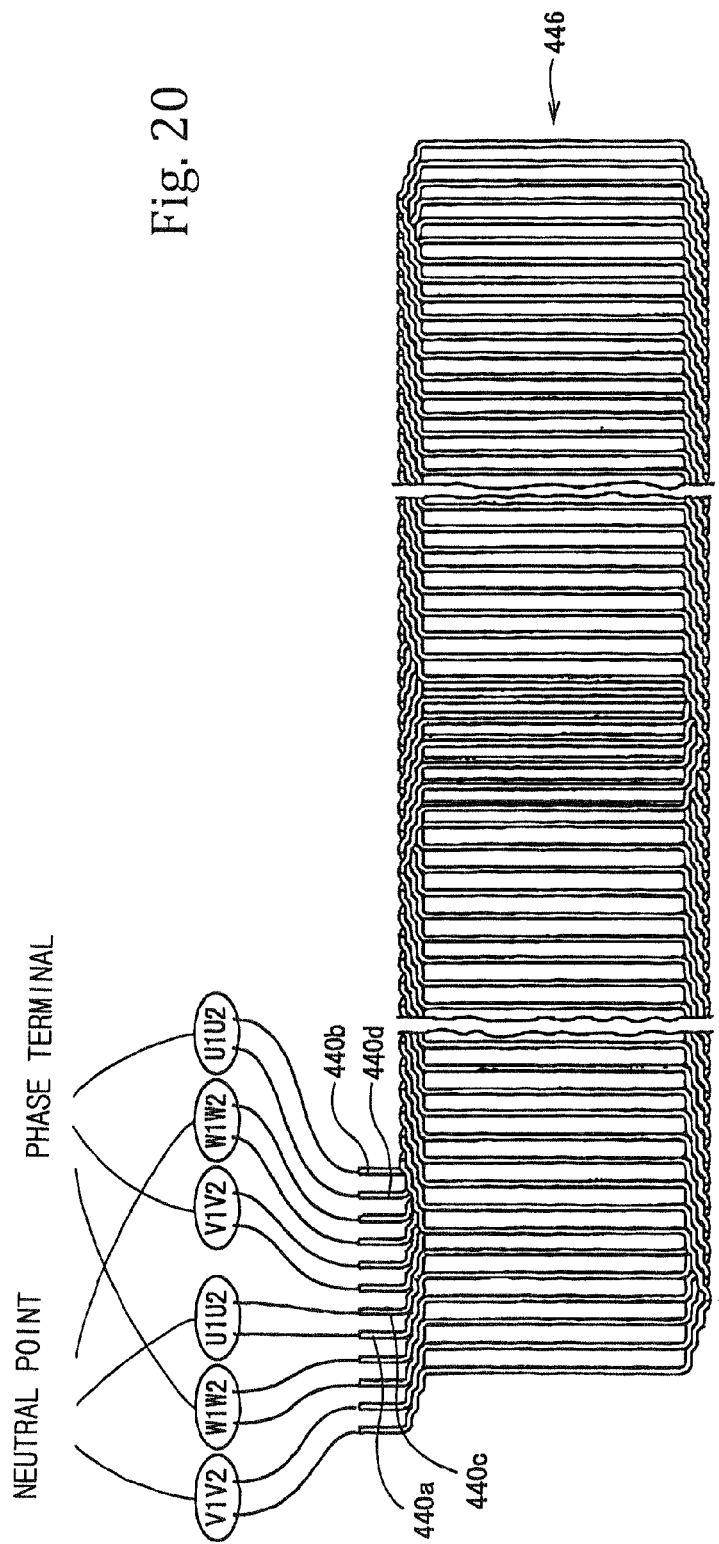
FIG. 20 is a view which shows an assembly of stator windings forming a coil of a rotary electric machine of the fourth embodiment.

FIG. 20 is a development view of the coil 404 of this embodiment. The joint of the ends of the windings 440a and 440c is the neutral point. The joint of the ends of the windings 440b and 440d is a phase terminal.

Figure 22:
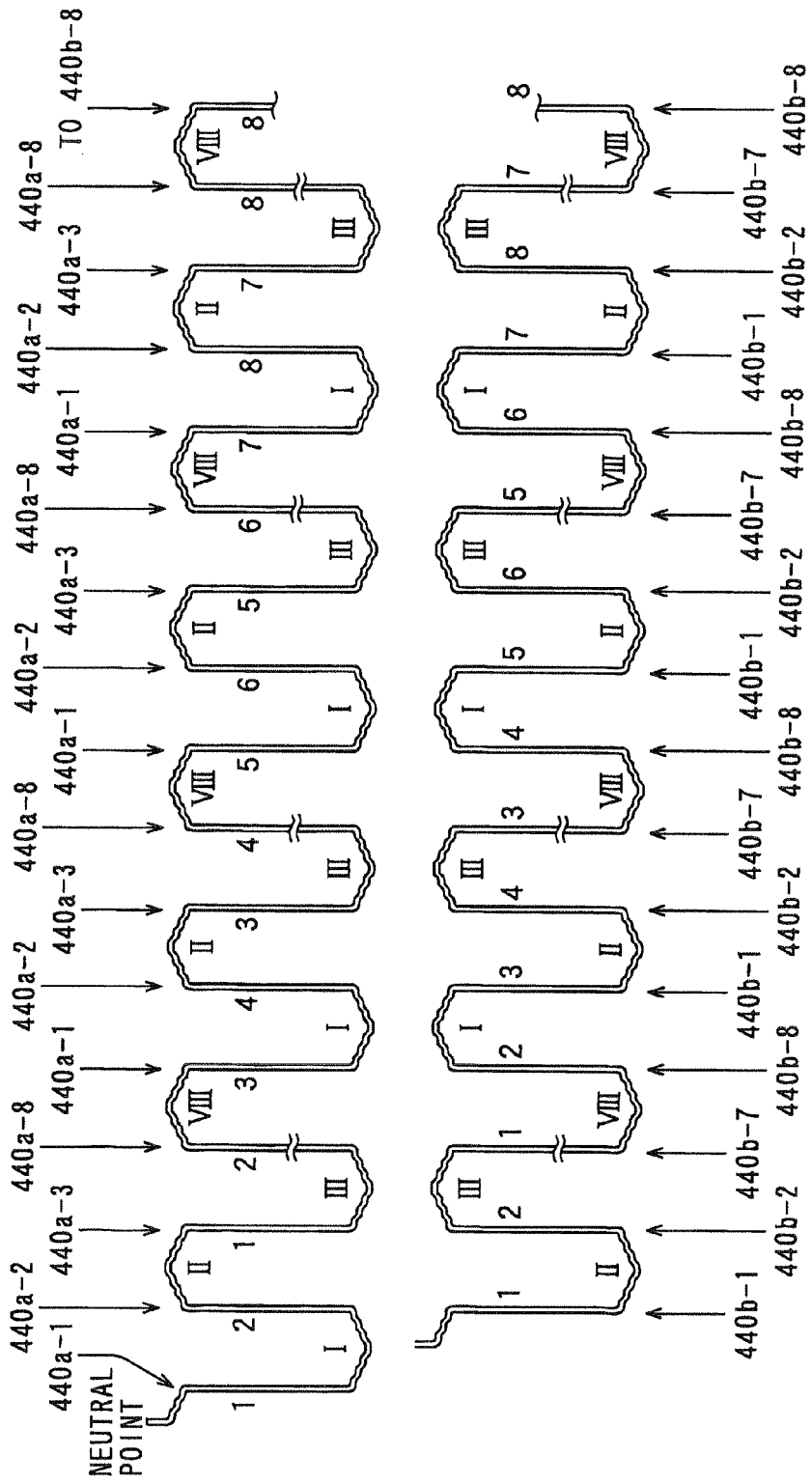
FIG. 22 is a view which shows locations where windings of a rotary electric machine are to be inserted into slots in the fourth embodiment.
Figure 23:
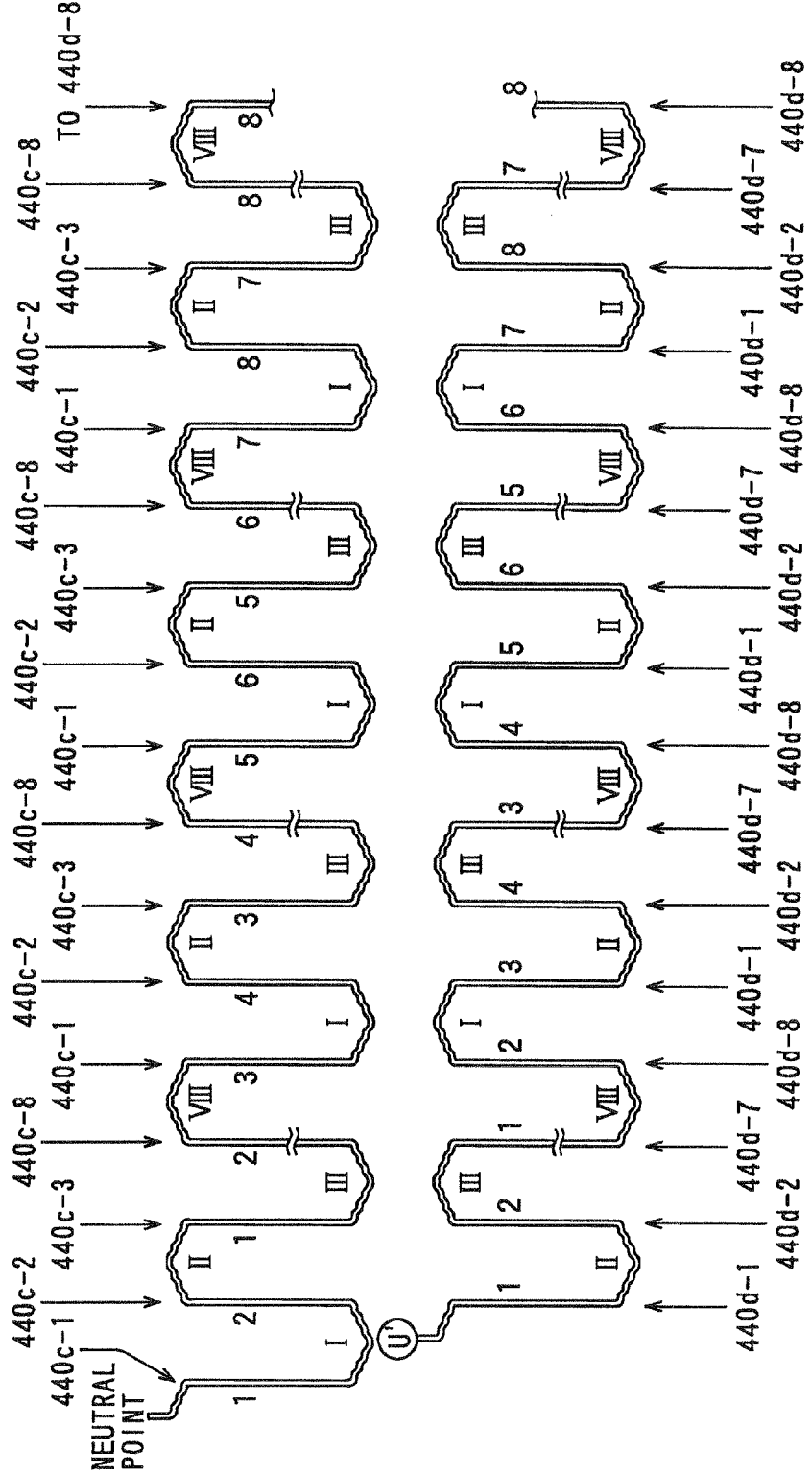
FIG. 23 is a view which shows locations where windings of a rotary electric machine are to be inserted into slots in the fourth embodiment.
Figure 24A:
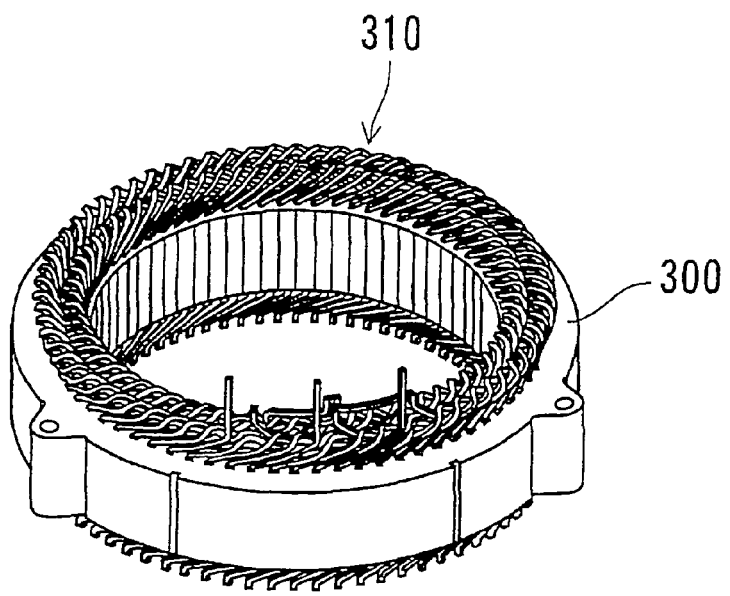
FIG. 24(A) is a perspective view which shows a conventional stator.
Figure 24B:
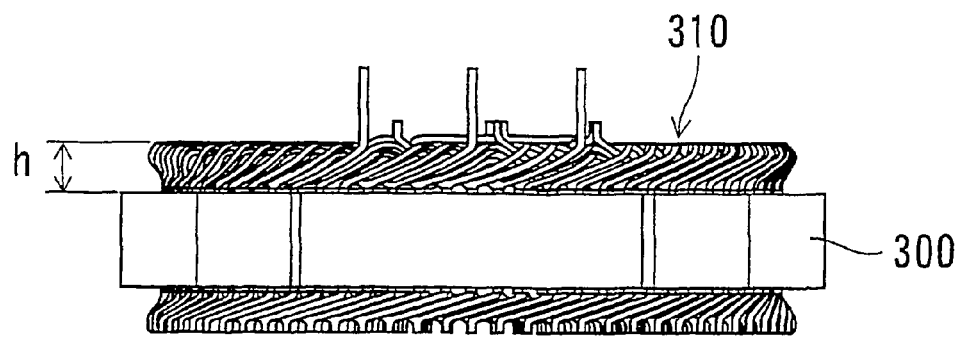
FIG. 24(B) is an illustration of a stator, as viewed from a lateral direction.
Figure 25:
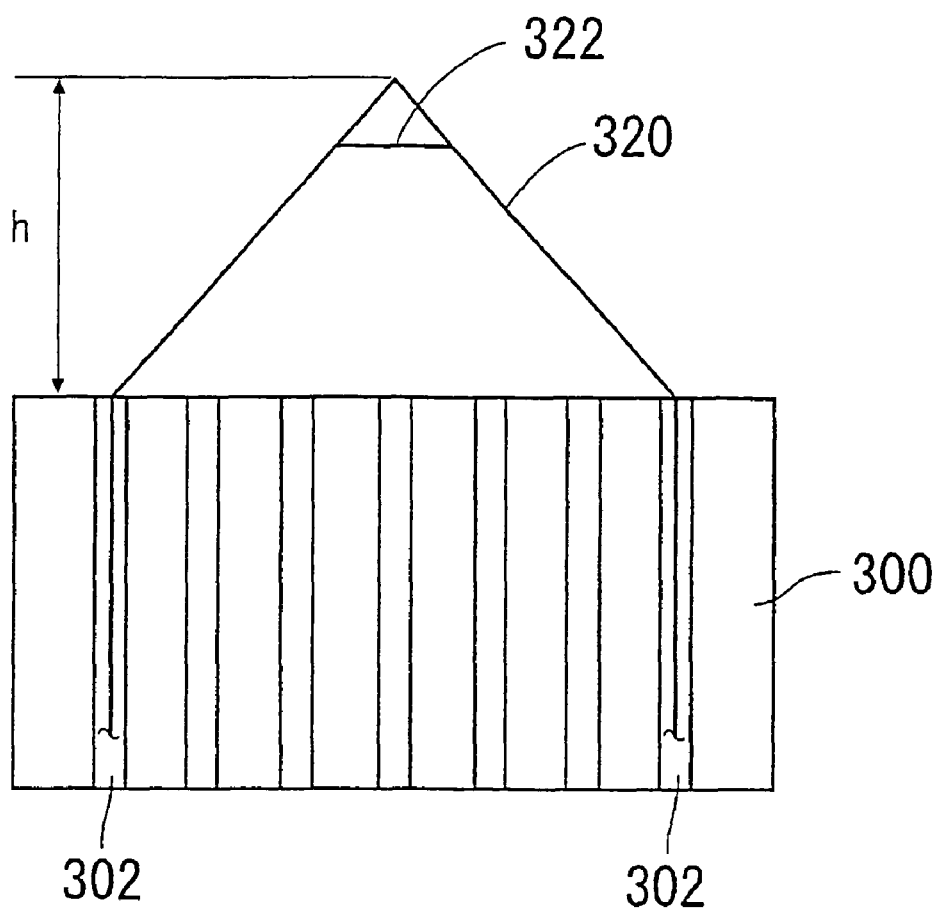
FIG. 25 is a schematic view which shows the shape of a coil end of conventional wire.

The respective phase windings are identical in connection thereof. How to wind the stator winding wires 440 of the coil 404 will be described below with reference to the U-phase winding. FIG. 21 illustrates the layout of connections of the stator winding wires 440 of the U-phase. FIG. 21(*a*) illustrates the layout of connections of wires 440a and 440b. FIG. 21(*b*) illustrates the layout of connections of wires 440c and 440d. FIG. 22 illustrates positional relations between the wires 440a and 440b and between the turned portions 444 thereof in the depthwise direction of the slots 431. FIG. 23 illustrates positional relations between the wires 440c and 440d and between the turned portions 444 thereof in the depthwise direction of the slots 431.

The connection between the stator winding wires 440a and 440b will be described below with reference to FIGS. 21(*a*) and 22. The stator 402 has eight poles. The slots 431 in which the U-phase stator winding wires 440 are illustrated as sixteen (16) slots 440*a*-1, 440*a*-2, . . . 440*a*-8, 440*b*-1, 440*b*-2, . . . , and 440*b*-8. Within the slot 431, the eight (8) in-slot portions 443 are laid to overlap each other in the depthwise direction. Locations in the slot 431 in the depth-wise direction thereof where the in-slot portions 443 are disposed are assigned with numerals 8, 7, 6, ..., and 1, respectively.

The stator winding wires 440*a* and 440*b* are joined in series. The end of the stator winding wire 440*a*-1 is connected to the neutral point. The end of the stator winding wire 440*b*-1 is joined to the wire 440*d* to make a connection with the U-phase terminal.

The stator winding wire 440*a* has the in-slot portion 443 which is disposed at the first location in the slot 440*a*-1 and is closest to the neutral position. The stator winding wire 440*b* has the in-slot portion 443 which is disposed at the first location in the slot 440*b*-1 and is closest to the end of the wire 440*b*.

The in-slot portion 443 of the stator winding wire 440*a* connecting with the adjacent one disposed in the slot 440*a*-1 through the turned portion 444 connects with the turned portion 444I that is one of the turned portion 444 lying on the end of the stator core 430 (will also be referred to as a lower end below) which is opposite the end of the stator core 430 (will also be referred to an upper end below) from which the end protrudes and connects with the neutral point and enters the second location in the slot 440*a*-2. In other words, the lower turned portion 444I connects between the in-slot portion 443 at the first location in the slot 440*a*-1 and the in-slot portion 443 at the second location in the slot 440*a*-2 on the lower end of the stator core 430.

The in-slot portion 443 of the stator winding wire 440*a* connecting the adjacent one disposed in the slot 440*a*-2 connects with the upper turned portion 444II and enters the first location in the slot 440*a*-3. In other words, the upper turned portion 444II connects between the second location in the slot 440*a*-2 and the first location in the slot 440*a*-3 on the upper end of the stator core 430.

The in-slot portion 443 of the stator winding wire 440*a* connecting with the adjacent one disposed in the slot 440*a*-3 connects with the turned portion 444III enters the second location in the slot 440*a*-4. As apparent from the above, the lower turned portions 444III connects between the first location in the slot 440*a*-3 and the second location in the slot 440*a*-4 on the lower end of the stator core 430.

The in-slot portion 443 of the stator winding wire 440*b* connecting with the adjacent one disposed in the slot 440*b*-1 connects with the lower turned portion 44II that is one of the turned portion 444 lying on lower end of the stator core 430 and enters the second location in the slot 440*b*-2. In other words, the turned portion 444II connects between the first location in the slot 440*b*-1 and the second location in the slot 440*b*-2 on the lower end of the stator core 430.

The in-slot portion 443 of the stator winding wire 440*b* connecting with the adjacent one disposed in the slot 440*b*-2 connects with the turned portion 444III and enters the first location in the slot 440*b*-3. In other words, the upper turned portion 444III connects between the second location in the slot 440*b*-2 and the first location in the slot 440*b*-3 on the upper end of the stator core 430.

The in-slot portion 443 of the stator winding wire 440*b* connecting with the adjacent one disposed in the slot 440*b*-3 connects with the turned portion 444IV and enters the second location in the slot 440*b*-4. In other words, the lower turned portions 444IV connects between the first location in the slot 440*b*-3 and the second location in the slot 440*b*-4 on the lower end of the stator core 430.

As apparent from the above, the two stator winding wires 440*a* and 440*b* are such that the upper turned portions 444II to 444VII lying above the upper end of the stator core 430 connect between the adjacent second and first locations for the in-slot portion 443, while the lower turned portions 444I to 44VIII lying below the lower end of the stator core 430 connect between the adjacent the first and second locations for the in-slot portion 443. In this manner, the in-slot portions 443 of the two stator winding wires 440*a* and 440*b* are disposed from the slot 440*a*-1 to the slot 440*a*-8 and from the slot 440*b*-1 to the slot 440*b*-8 along the circumference of the stator core 340. In the slots 440*a*-8 and 440*b*-8, the in-slot portions 443 of the stator winding wire 440*a* lie at the second locations.

The in-slot portions 443 of the stator winding wires 440*a* and 440*b* next to the ones at the second locations in the slots 440*a*-8 and 440*b*-8 are disposed at the third locations in the slots 440*a*-1 and 440*b*-1, respectively. In other words, the upper turned portions 444VIII and 444I above the upper end of the stator core 430 connect between the second locations in the slots 440*a*-8 and 440*b*-8 and the third locations in the slots 440*a*-1 and 440*b*-1 on the upper end of the stator core 430. Specifically, after being wound one time around the circumference of the stator core 430, the connected wires are wound and shifted radially inward by one layer.

The in-slot portion 443 of the stator winding wire 440*a* connecting with the ones at the third location of the slot 440*a*-1 connects with the lower turned portion 444I and enters the fourth location in the slot 440*a*-2. In other words, the lower turned portions 444I connects between the third location in the slot 440*a*-1 and the fourth location in the slot 440*a*-2 on the lower end of the stator core 430.

The in-slot portion 443 of the stator winding wire 440*a* connecting with the adjacent one disposed in the slot 440*a*-2 connects with the upper turned portion 444II on the upper end of the stator core 430 and enters the third location in the slot 440*a*-3. In other words, the upper turned portions 444II connects between the fourth location in the slot 440*a*-2 and the third location in the slot 440*a*-3 on the upper end of the stator core 430.

The in-slot portion 443 of the stator winding wire 440*a* connecting with the adjacent one disposed in the slot 440*a*-3 connects with the turned portion 444III on the lower end of the stator core 430 and enters the fourth location in the slot 440*a*-4. In other words, the turned portions 444III connects between the third location in the slot 440*a*-3 and the fourth location in the slot 440*a*-4 on the lower end of the stator core 430.

The stator winding wire 440*b* connecting with the third location of the slot 440*b*-1 connects with the lower turned portion 444II and enters the fourth location in the slot 440*b*-2. In other words, the lower turned portions 444II connects between the third location in the slot 440*b*-1 and the fourth location in the slot 440*b*-2 on the lower end of the stator core 430.

The in-slot portion 443 of the stator winding wire 440*b* connecting with the adjacent one in the slot 440*b*-2 connects with the upper turned portion 444III on the upper end of the stator core 430 and enters the third location in the slot 440*b*-3. In other words, the upper turned portions 444III connects between the fourth location in the slot 440*b*-2 and the third location in the slot 440*b*-3 on the upper end of the stator core 430.

The in-slot portion 443 of the stator winding wire 440*b* connecting with the adjacent one in the slot 440*b*-3 connects with the lower turned portion 444IV and enters the fourth location in the slot 440*b*-4. In other words, the lower turned portions 444IV connects between the third location in the slot 440*b*-3 and the second location in the slot 440*b*-4 on the lower end of the stator core 430.

As apparent from the above, the two stator winding wires 440*a* and 440*b* are such that the upper turned portions 444II to 444VII lying above the upper end of the stator core 430 connect between the adjacent in-slot portions 443 in the third and fourth locations, while the turned portions 444I to 444VIII lying blow the lower end of the stator core 430 connect between the adjacent in-slot portions 443 at the third and fourth locations. In this manner, the in-slot portions 443 of two stator winding wires 440*a* and 440*b* are disposed from the slot 440*a*-1 to the slot 440*a*-8 and from the slot 440*b*-1 to the slot 440*b*-8 along the circumference of the stator core 430. In the slots 440*a*-8 and 440*b*-8, the in-slot portions 443 of the stator winding wire 440*a* lie at the fourth locations.

The in-slot portions 443 of the stator winding wires 440*a* and 440*b* next to the ones at the fourth locations in the slots 440*a*-8 and 440*b*-8 are disposed at the fifth locations in the slots 440*a*-1 and 440*b*-1, respectively. In other words, the upper turned portions 444VIII and 444I connect between the fourth locations in the slots 440*a*-8 and 440*b*-8 and the fifth locations in the slots 440*a*-1 and 440*b*-1 above the upper end of the stator core 430. Specifically, after being wound one time around the circumference of the stator core 430, the connected wires are wound and shifted radially inward by one layer.

The stator winding wire 440*a* connecting with the fifth location of the slot 440*a*-1 connects with and enters the sixth location in the slot 440*a*-2 through the lower turned portion 444I. In other words, the lower turned portions 444I connects between the fifth location in the slot 440*a*-1 and the sixth location in the slot 440*a*-2 on the lower end of the stator core 430.

The in-slot portion 443 of the stator winding wire 440*a* lying adjacent the one in the slot 440*a*-2 connects with the upper turned portion 444II and enters the fifth location in the slot 440*a*-3. In other words, the upper turned portions 444II connects between the sixth location in the slot 440*a*-2 and the fifth location in the slot 440*a*-3 on the upper end of the stator core 430.

The in-slot portion 443 of the stator winding wire 440*a* lying adjacent the one in the slot 440*a*-3 connects with the lower turned portion 444III and enters the sixth location in the slot 440*a*-4. In other words, the lower turned portions 444III connects between the fifth location in the slot 440*a*-3 and the sixth location in the slot 440*a*-4 on the lower end of the stator core 430.

The stator winding wire 440*b* connecting with the fifth location of the slot 440*b*-1 connects with the lower turned portion 444II and enters the sixth location in the slot 440*b*-2. In other words, the lower turned portions 444II connects between the fifth location in the slot 440*b*-1 and the sixth location in the slot 440*b*-2 on the lower end of the stator core 430.

The in-slot portion 443 of the stator winding wire 440*b* lying adjacent the one in the slot 440*b*-2 connects with the upper turned portion 444III and enters the fifth location in the slot 440*b*-3. In other words, the upper turned portion 444III connects between the sixth location in the slot 440*b*-2 and the fifth location in the slot 440*b*-3 on the upper end of the stator core 430.

The in-slot portion 443 of the stator winding wire 440*b* lying adjacent the one in the slot 440*b*-3 connects with the lower turned portion 444IV and enters the sixth location in the slot 440*b*-4. In other words, the turned portion 444IV connects between the fifth location in the slot 440*b*-3 and the sixth location in the slot 440*b*-4 on the lower end of the stator core 430.

As apparent from the above, the two stator winding wires 440*a* and 440*b* are such that the upper turned portions 444II to 444VII lying above the upper end of the stator core 430 connect between the adjacent in-slot portions 443 at the fifth and sixth locations, while the lower turned portions 444I to 444VIII lying below the lower end of the stator core 430 connect between the adjacent in-slot portions 443 at the fifth and sixth locations. In this manner, the stator winding wires 440*a* and 440*b* extend from the slot 440*a*-1 to the slot 440*a*-8 and from the slot 440*b*-1 to the slot 440*b*-8 along the circumference of the stator core 430. In the slots 440*a*-8 and 440*b*-8, the in-slot portions 443 of the stator winding wire 440*a* lie at the sixth locations.

The in-slot portions 443 of the stator winding wires 440*a* and 440*b* next to the ones at the sixth locations in the slots 440*a*-8 and 440*b*-8 are disposed at the seventh locations in the slots 440*a*-1 and 440*b*-1, respectively. In other words, the upper turned portions 444VIII and 444I connect between the sixth locations in the slots 440*a*-8 and 440*b*-8 and the seventh locations in the slots 440*a*-1 and 440*b*-1 on the upper end of the stator core 430. Specifically, after being wound one time around the circumference of the stator core 430, the connected wires are wound and shifted radially inward by one layer.

The stator winding wire 440*a* connecting with the seventh location of the slot 440*a*-1 connects with the lower turned portion 444I and enters the eighth location in the slot 440*a*-2. In other words, the lower turned portions 444I connects between the seventh location in the slot 440*a*-1 and the eighth location in the slot 440*a*-2 on the lower end of the stator core 430.

The in-slot portion 443 of the stator winding wire 440*a* lying adjacent the one in the slot 440*a*-2 connects with the upper turned portion 444II and enters the seventh location in the slot 440*a*-3. In other words, the upper turned portions 444II connects between the eighth location in the slot 440*a*-2 and the seventh location in the slot 440*a*-3 on the upper end of the stator core 430.

The in-slot portion 443 of the stator winding wire 440*a* lying adjacent the one in the slot 440*a*-3 connects with the lower turned portion 444III and enters the eighth location in the slot 440*a*-4. In other words, the lower turned portion 444III connects between the seventh location in the slot 440*a*-3 and the eighth location in the slot 440*a*-4 on the lower end of the stator core 430.

The in-slot portion 443 of the stator winding wire 440*b* lying adjacent the one at the seventh location of the slot 440*b*-1 connects with the lower turned portion 444II and enters the eighth location in the slot 440*b*-2. In other words, the lower turned portion 444II connects between the seventh location in the slot 440*b*-1 and the eighth location in the slot 440*b*-2 on the lower end of the stator core 430.

The in-slot portion 443 of the stator winding wire 440*b* lying adjacent the one in the slot 440*b*-2 connects with the upper turned portion 444III and enters the seventh location in the slot 440*b*-3. In other words, the upper turned portion 444III connects between the eighth location in the slot 440*b*-2 and the seventh location in the slot 440*b*-3 on the upper end of the stator core 430.

The in-slot portion 443 of the stator winding wire 440*b* lying adjacent the one in the slot 440*b*-3 connects with the lower turned portion 444IV and enters the eighth location in the slot 440*b*-4. In other words, the lower turned portion 444IV connects between the seventh location in the slot 440b-3 and the eighth location in the slot 440b-4 on the lower end of the stator core 430.

As apparent from the above, the two stator winding wires 440a and 440b are such that the upper turned portions 444II to 444VII lying above the upper end of the stator core 30 connect between the adjacent in-slot portions 443 at the seventh and eighth locations, while the lower turned portions 441 to 44VIII lying blow the lower end of the stator core 430 connect between the adjacent in-slot portions 443 at the seventh and eighth locations. In this manner, the stator winding wires 440a and 440b extend from the slot 440a-1 to the slot 440a-8 and from the slot 440b-1 to the slot 440b-8 along the circumference of the stator core 430. In the slots 440a-8 and 440b-8, the in-slot portions 443 of the stator winding wire 440a lie at the eighth locations.

The in-slot portions 443 disposed in the slots 440a-8 and 440b-8 are joined. In the manner, the stator winding wires 440a and 440b are wound around the stator core 430.

Next, connections of the stator winding wires 440c and 440d are shown in FIGS. 21(b) and 23 which are substantially the same as those of the stator winding wires 440a and 440b, and explanation thereof in detail will be omitted here.

In this embodiment, the distances between the crank portion 444A and the steps 444B to 444D of the turned portions 444 meet a relation of $l_1 > l_2 = l_3$ (or it $l_1 \geq l_2 = l_3$), thereby avoiding the interference between the stator winding wires 440 having the different turned portions 444 and thus enabling the turned portions 444 to overlap each other without any clearances arising from the interference. This enables the turned portions 444 to be wound tightly.

In this embodiment, the distance between the crank portion 444A and the uppermost step 444B is long, thereby avoiding the interference between the turned portions overlapping each other.

Other Embodiments

In the above embodiments, the stator of the rotary electric machine working as the electric motor and the electric generator is explained. The stator of the above embodiments may be used as a stator of the rotary electric machine working as either one of the electric motor and the electric generator.

In the above embodiments, the wire continuing over the entire circumference of the stator core 12 defines the stator winding for each phase, but however, the stator winding may alternatively be made by welding U-shaped segment conductors to each other and forming the crank portion and the steps, as described in the first and second embodiments.

The stator windings are not only limited to the use for three phases, but may be used for multi-phase. If the number of stator windings is k, and the number of slots for each phase per pole of the stator is n, the number of the steps of the turned portion of the wire is preferably k×n.

In the above embodiments, the crank portion is formed substantially at the middle of the turned portion, but does not needs be formed at the middle of the turned portion as long as the steps are formed at sections of the turned portion which protrude from the slots.

In the above embodiments, the structure in which the rotor is disposed inside the inner circumference of the stator so as to face the stator on the side of the inner circumference is described, but however, the structure in which the rotor is disposed outside the outer circumference of the stator so as to face the stator on the side of the outer circumference.

In the above embodiments, the three-phase stator windings 20 are star-connected, but however, may be delta-connected in the form of an annular shape.

As described above, the invention is not limited to the above embodiments and can be embodied in various ways without departing from the principle of the invention.

The invention claimed is:

1. A stator for a rotary electric machine comprising:
   a stator core having a plurality of slots formed in a circumferential direction thereof; and
   stator windings disposed in the slots of the stator core, each of the stator windings including in-slot portions disposed in the slots, respectively, and a turned portion extending outside the slots and connecting two of the in-slot portions disposed in different slots, each of the turned portions having a top portion located farthest from the stator core in an axial direction of the stator core and steps located on both sides of the top portion.

2. A stator as set forth in claim 1, wherein the steps lying on both sides of the top portion of each of the turned portions are identical in interval between themselves and the stator core in the axial direction of the stator core.

3. A stator as set forth in claim 1, wherein a length of each of the steps extending parallel to an end surface of the stator core is smaller than or equal to an interval between every adjacent two of the slots in a circumferential direction of the stator core.

4. A stator as set forth in claim 1, wherein the turned portions are shaped stepwise to have a plurality of steps including said steps, located at different distances from the stator core in the axial direction of the stator core.

5. A stator as set forth in claim 1, wherein if the number of phases of the stator windings is k, and the number of the slots for each phase per pole of a rotor having a plurality of magnetic poles different alternately in the circumferential direction is n, the number of the steps formed at the turned portion is k×n.

6. A stator as set forth in claim 1, each of the turned portions has a crank-shaped crank portion formed at a location farthest away from the stator core.

7. A stator as set forth in claim 6, wherein each of the crank portions extends in parallel to an end surface of the stator core.

8. A stator as set forth in claim 6, wherein the crank portion is shifted in a radial direction of the stator core by a width of a wire making each of the stator windings.

9. A stator as set forth in claim 1, wherein each of the turned portions is laid to overlap a circumferentially adjacent one of the turned portions in the axial direction of the stator core.

10. A stator as set forth in claim 1, wherein each of the stator winding is rectangular in transverse cross section thereof.

11. A stator as set forth in claim 1, wherein the stator windings continue over an entire circumference of the stator core.

12. A stator as set forth in claim 1, wherein each of the stator windings has a conductor and an insulating film wrapped about, an outer periphery of the conductor, the insulating film having a thickness of 100 to 200 μm.

13. A stator as set forth in claim 12, wherein the insulating film has an inner layer and an outer layer covering the inner layer, the outer layer being lower in glass-transition temperature than the inner layer.

14. A stator as set forth in claim 12, wherein each of the stator windings has a fusing material covering an outer periphery of the insulating film.

15. A rotary electric machine comprising the stator as set forth in claim 1 and a rotor that has magnetic poles different alternately in a circumferential direction thereof.

16. A stator for a rotary electric machine comprising:
a stator core having a plurality of slots formed in a circumferential direction thereof; and
stator windings that are disposed in the slots of the stator core, each of the stator windings including in-slot portions disposed in the slots, respectively, and a turned portion extending outside the slots and connecting two of the in-slot portions disposed in the different slots, each of the turned portions having a crank-shaped crank portion located farthest from the stator core in an axial direction of the stator core and a plurality of steps that are located between the crank portion and each of the in-slot portions at different distances from an end surface of the stator core in the axial direction of the stator core, the crank portion and the steps extending parallel to the end surface of the stator core,
wherein a distance $l_1$ between the crank portion and an uppermost one of the steps of each of the turned portion located farthest from the end surface of the stator core among the steps is longer than a distance $l_2$ between every two of the steps disposed adjacent each other in the axial direction of the stator core.

17. A stator as set forth in claim 16, wherein the distance $l_1$ is 1.02 to 1.3 times greater than the distance $l_2$.

18. A stator as set forth in claim 16, wherein an inclination of a joint between an end of the crank portion and an end of the uppermost step is greater than that of a joint between ends of every two of the steps disposed adjacent each other in the axial direction of the stator core.

19. A stator for a rotary electric machine comprising:
a stator core having a plurality of slots formed in a circumferential direction thereof; and
stator windings disposed in the slots of the stator core, each of the stator windings including in-slot portions disposed in the slots, respectively, and a turned portion extending outside the slots and connecting two of the in-slot portions disposed in different slots, each of the turned portions having steps extending parallel to an end of the stator core and are located at different distances from the end of the stator core in the axial direction of the stator core.

20. A stator as set forth in claim 19, wherein each of the turned portions has the at least three steps located at the different distances from the end of the stator core in the axial direction of the stator core.

* * * * *